US012767530B2

(12) United States Patent
Merida-Donis et al.

(10) Patent No.: US 12,767,530 B2
(45) Date of Patent: Oct. 20, 2026

(54) HYDROGEN PRODUCTION FROM HYDROCARBONS WITHOUT CARBON DIOXIDE EMISSIONS

(71) Applicant: The University of British Columbia, Vancouver (CA)

(72) Inventors: Walter R. Merida-Donis, Vancouver (CA); Amirhossein Sharafianardakani, Vancouver (CA); Omar Herrera, Vancouver (CA)

(73) Assignee: The University of British Columbia, Vancouver (CA)

( * ) Notice: Subject to any disclaimer, the term of this patent is extended or adjusted under 35 U.S.C. 154(b) by 855 days.

(21) Appl. No.: 17/925,298

(22) PCT Filed: May 19, 2021

(86) PCT No.: PCT/CA2021/050683
§ 371 (c)(1),
(2) Date: Nov. 14, 2022

(87) PCT Pub. No.: WO2021/232158
PCT Pub. Date: Nov. 25, 2021

(65) Prior Publication Data
US 2023/0219814 A1 Jul. 13, 2023

Related U.S. Application Data

(60) Provisional application No. 63/026,955, filed on May 19, 2020.

(51) Int. Cl.
*C01B 3/26* (2006.01)
*B01J 8/08* (2006.01)
(Continued)

(52) U.S. Cl.
CPC ................ *C01B 3/26* (2013.01); *B01J 8/085* (2013.01); *B01J 10/005* (2013.01);
(Continued)

(58) Field of Classification Search
None
See application file for complete search history.

(56) References Cited

U.S. PATENT DOCUMENTS 10,633,592 B2 4/2020 Henry et al.
2018/0312760 A1* 11/2018 Sundaram ................ C10G 9/36
(Continued)

OTHER PUBLICATIONS

Munera Parra, A.A. et al., Molten metal capillary reactor for the high-temperature pyrolysis of methane, International Journal of Hydrogen Energy, Dec. 26, 2016, vol. 42, pp. 13641-13648, Laboratory for Chemical Reaction Engineering, Technical University of Dortmund, Germany.

*Primary Examiner* — Anthony J Zimmer
*Assistant Examiner* — Logan Laclair
(74) *Attorney, Agent, or Firm* — Oyen Wiggs Green & Mutala LLP

(57) ABSTRACT

A method for thermal cracking of a hydrocarbon to produce hydrogen gas and carbon comprises heating a molten medium to an operating temperature sufficient to thermally crack the hydrocarbon. The operating temperature may, for example be in the range of 600° C. to 1100° C. The method mixes the hydrocarbon into the heated molten medium and pumping the mixed molten medium and hydrocarbon through a reactor. In the reactor, the hydrocarbon undergoes a thermal cracking reaction which forms hydrogen gas and carbon black. The method separates the carbon and hydrogen gas from the molten medium that has passed through the reactor. In some embodiments, the flow of the molten medium in the reactor is a turbulent flow.

12 Claims, 14 Drawing Sheets

(51) Int. Cl.
*B01J 10/00* (2006.01)
*B01J 19/24* (2006.01)
*B01J 35/27* (2024.01)

(52) U.S. Cl.
CPC ........... *B01J 19/2405* (2013.01); *B01J 35/27* (2024.01); *B01J 2208/00911* (2013.01); *B01J 2219/00164* (2013.01); *C01B 2203/0277* (2013.01); *C01B 2203/04* (2013.01); *C01B 2203/0833* (2013.01); *C01B 2203/1058* (2013.01); *C01B 2203/107* (2013.01); *C01B 2203/1241* (2013.01); *C01B 2203/1614* (2013.01); *C01B 2203/169* (2013.01)

(56) References Cited

U.S. PATENT DOCUMENTS

2019/0055173 A1 2/2019 Desai et al.
2020/0002165 A1* 1/2020 Desai ........................ B01J 38/48
2020/0071162 A1 3/2020 Gupta et al.

* cited by examiner

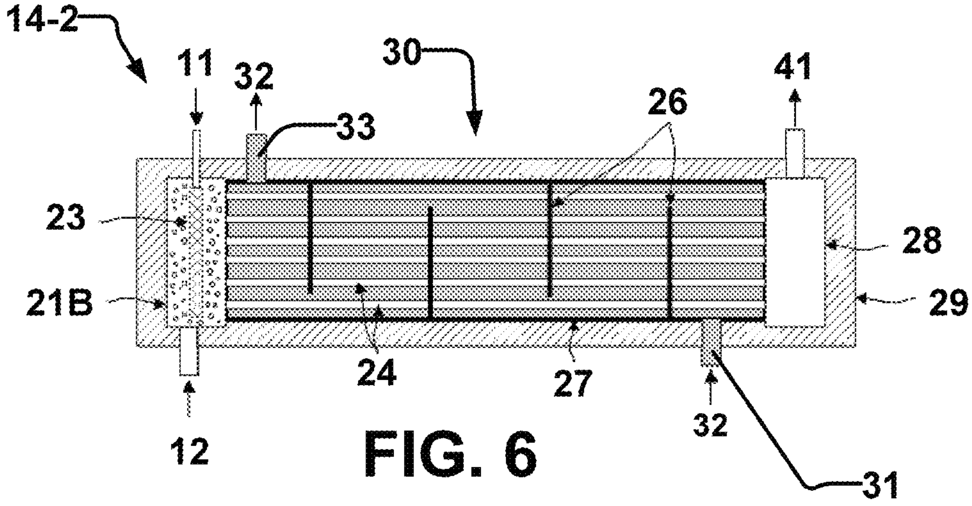
FIG. 6
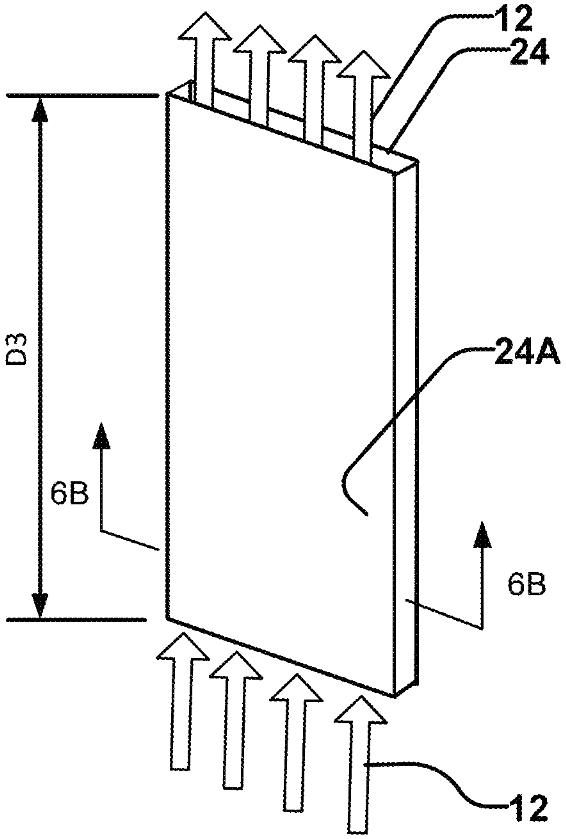
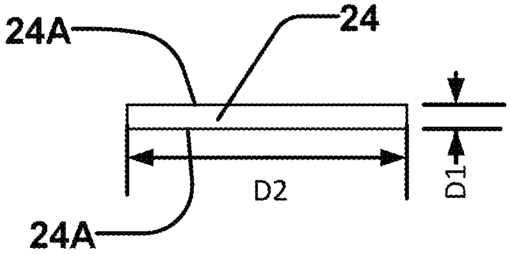
FIG. 6A
FIG. 6B

HYDROGEN PRODUCTION FROM HYDROCARBONS WITHOUT CARBON DIOXIDE EMISSIONS

CROSS-REFERENCE TO RELATED APPLICATIONS

This application claims priority from, and for the purpose of the United States of America the benefit under 35 U.S.C. § 119 in connection with, U.S. application No. 63/026,955 filed 19 May 2020 and entitled HYDROGEN PRODUCTION FROM HYDROCARBONS WITHOUT CARBON DIOXIDE EMISSIONS which is hereby incorporated herein by reference for all purposes.

FIELD

This invention relates to producing hydrogen from hydrocarbons by thermal cracking. The invention may be embodied, for example, in reactors for producing hydrogen, methods for producing hydrogen and systems for producing hydrogen.

BACKGROUND

Hydrogen is useful as a fuel, for use in chemical processing and for other applications. However, only a limited amount of elemental hydrogen is freely available in nature. Currently, more than 96% of all hydrogen used in industry is produced from fossil sources. Methane ($CH_4$) in its pure form or as a component of natural gas is one of the main sources for large-scale hydrogen production. Steam methane reforming (SMR) (see Equation 1) is the dominant method for hydrogen production (48% of total global production).

$$CH_4 + 2H_2O \rightarrow CO_2 + 4H_2 \qquad (1)$$

$$\Delta H^\circ = 165\ kJ/\text{mol}$$

The SMR process undesirably emits greenhouse gases and consumes large quantities of water. Under stoichiometric conditions, the SMR process yields 0.5 kg of $H_2$ per kg of $CH_4$. Commercial processes emit 9 to 14 kg of $CO_2$ per kg of $H_2$. Also, the SMR process requires water to reduce carbon monoxide to carbon dioxide in a water-gas-shift reaction. Water life-cycle assessments indicated that the SMR process requires 18 to 32 kg of water per kg of $H_2$.

There are various alternative technologies capable of producing hydrogen from hydrocarbons in large quantities. These technologies vary in cost and in $CO_2$ life-cycle emissions. Some of these technologies are: coal gasification, biomass gasification, and methane thermal cracking.

The SMR, and coal and biomass gasification technologies can be coupled with the carbon capture and sequestration (CCS) technology to reduce their $CO_2$ emissions. However, CCS significantly increases the capital cost of infrastructure and involves significant operating expenses. Consequently, hydrogen production cost is increased where CCS is provided. A 2017 study indicated that the $CO_2$ emissions from the SMR process with CCS can be reduced by 53% to 90%, while the hydrogen production cost increases by $0.2 to $0.5 per kg of $H_2$ produced. Other limitations of CCS technologies include how to properly sequester captured $CO_2$ which adds to the cost and limits the CCS technology deployment to suitable geographic locations, such as oil and gas extraction sites.

Methane thermal cracking has promise for producing hydrogen at a lower cost with lower $CO_2$ emissions than SMR. The following references discuss thermal cracking of methane by contacting the methane with hot molten media:

- B. Parkinson, J. W. Matthews, T. B. McConnaughy, D. C. Upham, E. W. McFarland, *Techno-Economic Analysis of Methane Pyrolysis in Molten Metals: Decarbonizing Natural Gas*, Chem. Eng. Technol. 40, no. 6 (2017) 1022-1030. doi:10.1002/ceat.201600414.
- R. Dagle, V. Dagle, M. Bearden, J. Holladay, T. Krause, S. Ahmed, *R&D Opportunities for Development of Natural Gas Conversion Technologies for Co-Production of Hydrogen and Value-Added Solid Carbon Products*, Argonne National Laboratory, U.S., 2017.
- D. Paxman, *Experimental and Theoretical Investigation of Solar Molten Media Methane Cracking for Hydrogen Production*, University of Alberta, 2014. doi: 10.1016/j.egypro.2014.03.215.
- U. P. M. Ashik, W. M. A. Wan Daud, H. F. Abbas, *Production of greenhouse gas free hydrogen by thermocatalytic decomposition of methane—A review*, Renew. Sustain. Energy Rev. 44 (2015) 221-256. doi: 10.1016/j.rser.2014.12.025.
- M. Serban, M. A. Lewis, C. L. Marshall, R. D. Doctor, Hydrogen production by direct contact pyrolysis of natural gas, Energy and Fuels. 17, no. 3 (2003) 705-713. doi:10.1021/ef020271q.
- D. C. Upham, V. Agarwal, A. Khechfe, Z. R. Snodgrass, M. J. Gordon, H. Metiu, E. W. McFarland, Catalytic molten metals for the direct conversion of methane to hydrogen and separable carbon, Science 358 (2017) 917-921. doi:10.1126/science.aao5023.

The experiments and techno-economic analysis reported in these publications demonstrate that thermal cracking of methane by contacting the methane with hot molten media can work. However, problems remain. One problem is that accumulation of carbon black can interfere with hydrogen production by interfering with heat transfer and creating blockages.

There is a need for improved technologies that are applicable to the large scale generation of hydrogen. There is a particular need for practical technologies for generating hydrogen that emit less $CO_2$ and are cost effective.

SUMMARY

This invention has a number of aspects. These include, without limitation:

- Methods for hydrogen production by thermal cracking;
- Systems for hydrogen production by thermal cracking;
- Reactors for hydrogen production by thermal cracking;
- Separation systems for separating products of a thermal cracking reaction;

One aspect of the present invention provides a method for thermal cracking of a hydrocarbon to produce hydrogen gas, the method comprising: heating a molten medium to an operating temperature sufficient to thermally crack the hydrocarbon; mixing the hydrocarbon into the heated molten medium; pumping the mixed molten medium and hydrocarbon to flow through a reactor such that the hydrocarbon is thermally cracked to yield carbon and hydrogen gas; and separating the carbon and hydrogen gas from the molten medium that has passed through the reactor.

One aspect of the present invention provides a method for thermal cracking of a hydrocarbon to produce hydrogen gas, the method comprising: pumping a molten medium to flow through a reactor; mixing the hydrocarbon into the molten medium at or upstream from the reactor such that the mixed hydrocarbon and molten medium is carried through the reactor; at least while the mixed hydrocarbon and molten medium is being carried through the reactor, maintaining a temperature of the molten medium within at least a portion of the reactor at an operating temperature sufficient to thermally crack the hydrocarbon such that the hydrocarbon in the mixed molten medium and hydrocarbon is thermally cracked to yield carbon and hydrogen gas; and separating the carbon and hydrogen gas from the molten medium that has passed through the reactor. In some embodiments the molten medium is recirculated tin a process loop that includes the reactor.

Various features that may be included in methods according to either of the above aspects are provided below.

In some embodiments, a turbulent flow of the mixed molten medium and hydrocarbon is maintained in the reactor.

In some embodiments, the flow of the mixed molten medium and hydrocarbon in the reactor is characterized by a Reynolds number of at least 3000 or at least 10000 or at least 50000. The Reynolds number may be calculated based on the flow rate of the molten medium in the absence of a feed of the hydrocarbon as discussed herein.

In some embodiments, the method comprises, in the reactor, generating the hydrogen gas and carbon by thermal cracking of the hydrocarbon wherein the thermal cracking occurs primarily in the bulk of the molten medium. For example, at least 65% or 75% or 90% of the thermal cracking may occur in the bulk of the molten medium.

In some embodiments, mixing the hydrocarbon into the molten medium introduces bubbles of the hydrocarbon into the molten medium.

In some embodiments, the bubbles have sizes that are at least a factor of 25 smaller in area than a cross sectional area of a passage in the reactor within which the mixed molten medium and hydrocarbon is flowed through the reactor.

In some embodiments, introducing the bubbles comprises delivering the hydrocarbon under pressure to a bubble generator in the molten medium.

In some embodiments, the bubble generator comprises a porous metal or ceramic.

In some embodiments, the porous metal or ceramic has pore sizes in the range of about 2 microns to about 50 microns.

In some embodiments, the bubble generator comprises one or more of: a sparger, a rotary degasser, a sintered metal sparger, a porous metal member and a porous ceramic member.

In some embodiments, the bubbles have diameters in the range of 1 micron to 5 millimeters.

In some embodiments, the reactor comprises a plurality of conduits and pumping the mixed molten medium and hydrocarbon through the reactor comprises flowing portions of the mixed molten medium and hydrocarbon through each of the conduits. The number of conduits may be scaled to increase a capacity of the reactor In some embodiments, the conduits define passages of sufficiently large dimensions to allow a 0.7 inch diameter sphere to be passed along the conduits without contacting a wall of the conduits.

In some embodiments, pumping the mixed molten medium and hydrocarbon through the reactor comprises flowing the mixed molten medium and hydrocarbon upwardly in the reactor (e.g. vertically).

In some embodiments, flowing the mixed molten medium and hydrocarbon in the reactor comprises flowing the mixed molten medium and hydrocarbon in a vertically upward direction through the reactor.

In some embodiments, pumping the mixed molten medium and hydrocarbon through the reactor comprises flowing the mixed molten medium and hydrocarbon horizontally in the reactor.

In some embodiments, the method comprises in the reactor, adding heat to the molten medium.

In some embodiments, the molten medium has a melting temperature of 1200° C. or less.

In some embodiments, the molten medium comprises a molten metal.

In some embodiments, the molten metal comprises tin.

In some embodiments, the molten metal is selected from the group consisting of: Pb, Sn, In, Bi, Ga, Ag, alloys of Pt, alloys of Ni, Cu—Sn alloys, and mixtures thereof.

In some embodiments, the molten medium comprises a salt.

In some embodiments, the salt is selected from the group consisting of: LiCl, KCl, KBr and NaBr.

In some embodiments, the molten medium comprises a catalyst that catalyzes the thermal cracking of the hydrocarbon.

In some embodiments, the catalyst comprises solid particles dispersed in the molten medium.

In some embodiments, the solid particles comprise a nickel based catalyst and/or a platinum based catalyst.

In some embodiments, the molten medium has a boiling point of at least 1000° C.

In some embodiments, the molten medium has a density in the range of about 5000 to 8000 kg/m3.

In some embodiments, the molten medium has a dynamic viscosity of 0.2-20 mPa·s or less at the operating temperature.

In some embodiments, the molten medium has a vapor pressure of 200 Pa or less at the operating temperature.

In some embodiments, the molten medium has a surface tension of at least 300 mN/m.

In some embodiments, the solubility of hydrogen in the molten medium at the operating temperature is $50\times10^{-2}$ $mL_{STP}$/gmetal or less.

In some embodiments, the molten medium has a specific heat capacity Cp of at least 250 J/kg·K.

In some embodiments, the molten medium has a thermal conductivity of at least 20 W/(m·K).

In some embodiments, the molten medium has a thermal diffusivity of at least $1\times10^{-5}$ $m^2/s$.

In some embodiments, the molten medium has a temperature of at least 600° C. when the molten medium is passing through the reactor.

In some embodiments, the molten medium has a temperature of at least 800° C. when the molten medium is passing through the reactor.

In some embodiments, the molten medium has a temperature in the range of 800° C. to 1200° C. when the molten medium is passing through the reactor.

In some embodiments, the hydrocarbon comprises methane.

In some embodiments, the hydrocarbon comprises natural gas.

In some embodiments, the method comprises preheating the hydrocarbon prior to mixing the hydrocarbon into the molten medium.

In some embodiments, the reactor comprises a plurality of conduits and the method comprises dividing the circulating molten medium so that a portion of the circulating molten medium flows through each of the plurality of conduits.

In some embodiments, the conduits comprise parallel conduits and a ratio of width to height of the parallel conduits is at least 20:1.

In some embodiments, a dwell time of the mixture of molten medium and hydrocarbon in each of the plurality of conduits is in the range of 0.1 s to 100 s.

In some embodiments, a velocity of the molten medium in the plurality of conduits is in the range of 0.01 m/s to 10 m/s.

In some embodiments, mixing the hydrocarbon into the heated molten medium comprises mixing the hydrocarbon in a weight ratio of at least 1 g of the hydrocarbon to 18 g of the molten medium.

In some embodiments, separating carbon and hydrogen gas from the molten medium that has passed through the reactor comprises introducing the molten medium into a vessel, allowing the carbon to float at an interface between the molten medium and another fluid in the vessel and collecting the floating carbon.

In some embodiments, the method allows hydrogen gas to rise into a header above the molten medium and collecting the hydrogen gas from the header.

In some embodiments, the method comprises purifying the hydrogen gas.

One aspect of the present invention provides a system for thermal cracking of a hydrocarbon to produce hydrogen gas, the system comprising: a process loop containing a molten medium, the process loop comprising a reactor, a multiphase separation unit and a pump connected to circulate the molten medium around the process loop; a heater operable to heat the molten medium to an operating temperature sufficient to thermally crack the hydrocarbon; a gas fluid contactor operable to mix the hydrocarbon into the circulating molten medium at or upstream from the reactor.

In some embodiments, the pump is controlled to pump the molten medium through the reactor at a velocity such that a flow of the mixed molten medium and hydrocarbon in the reactor is a turbulent flow.

In some embodiments, the turbulent flow is characterized by a Reynolds number of at least 3000 or at least 10000 or at least 50000.

In some embodiments, the pump is controlled to pump the molten medium through the reactor at a velocity such that a flow of the molten medium in the reactor is a turbulent flow.

In some embodiments, the gas fluid contactor comprises a distributor, the reactor comprises a plurality of passages and the distributor is configured to distribute the hydrocarbon among the plurality of passages.

In some embodiments, the gas fluid contactor comprises a bubble generator.

In some embodiments, the bubble generator comprises one or more of a sparger, rotary degasser, sintered metal sparger, porous metal member and porous ceramic member.

In some embodiments, the bubble generator comprises a porous member, the reactor comprises a plurality of passages and pores of the porous member are much smaller than cross sectional dimensions of the plurality of passages.

In some embodiments, the pores have areas that are at least a factor of 25 smaller in area than a cross sectional area of the passages of the plurality of passages.

In some embodiments, the pores have diameters in the range of 1 micron to 50 microns or in the range of 11 micron to 5 millimeters.

In some embodiments, the reactor comprises a plurality of conduits and the plurality of conduits each define a passage for carrying the molten medium.

In some embodiments, each of the plurality of conduits are of sufficiently large dimensions to allow a 0.7 inch diameter sphere to be passed along the conduit without contacting a wall of the conduit.

In some embodiments, the conduits comprise parallel conduits comprising parallel first and second plates spaced apart by a first distance.

In some embodiments, edges of the first and second plates are in contact with opposing sides of a shell of the reactor.

In some embodiments, a breadth of the parallel conduit is at least 10 or 20 or 40 or 50 or 100 times larger than a spacing between the first and second plates.

In some embodiments, the reactor is oriented such that the plurality of conduits change elevation. For example, the conduits may extend vertically.

In some embodiments, an elevation of an inlet for delivering the molten medium into the reactor is substantially equal to an elevation of an outlet for carrying the molten medium out of the reactor.

In some embodiments, the reactor is oriented such that the plurality of passages extend at least generally horizontally.

In some embodiments, the molten medium comprises a molten metal.

In some embodiments, the molten medium comprises tin.

In some embodiments, the molten medium comprises one of or a mixture of: Pb, Sn, In, Bi, Ga, Ag, alloys of Pt, alloys of Ni and Cu—Sn alloys.

In some embodiments, the molten medium comprises a salt.

In some embodiments, the molten medium comprises one of LiCl, KCl, KBr and NaBr.

In some embodiments, the molten medium comprises a catalyst that catalyzes a thermal cracking reaction.

In some embodiments, the catalyst comprises solid particles dispersed in the molten medium.

In some embodiments, the solid particles comprise a nickel based catalyst and/or a platinum based catalyst.

In some embodiments, a first heat exchanger is connected to take heat from the molten medium at a point in the loop downstream from the reactor and upstream from the pump.

In some embodiments, a second heat exchanger is connected to deliver heat to the molten medium at a point in the loop downstream from the pump and upstream from the reactor.

In some embodiments, a third heat exchanger is connected to transfer heat into the hydrocarbon to raise a temperature of the hydrocarbon being delivered to the gas fluid contactor.

In some embodiments, a compressor is connected to compress the hydrocarbon to increase a pressure of the hydrocarbon being delivered to the gas fluid contactor.

In some embodiments, the reactor comprises a header, a collector, a plurality of conduits extending between the header and the collector, a shell enclosing the plurality of conduits and a heating system configured to supply a heated fluid into an interior of the shell.

In some embodiments, the conduits are finned.

In some embodiments, the system comprises a corrosion resistant coating on inner walls of the conduits.

In some embodiments, the conduits have lengths in the range of 3 m to 4 m.

In some embodiments, the conduits comprise tubes.

In some embodiments, the tubes have diameters in the range of ¼" to 5".

In some embodiments, the tubes have diameters in the range of ¾" to 2".

In some embodiments, the multiphase separation unit comprises: a vessel connected to receive a post-reaction mixture from the reactor, the vessel comprising a headspace arranged to collect gases that rise into the headspace from the post-reaction mixture and a collection device arranged to collect carbon from an interface between the molten material and the headspace.

In some embodiments, the collection device comprises one or more of a skimmer, chain conveyor, belt conveyor, decanter centrifuge, mesh filter and auger.

It is emphasized that the invention relates to all combinations of the above features, even if these are recited in different claims or in claims of different types. Features of apparatus as described herein may be applied in methods according to the invention and apparatus according to the invention may be configured to perform method steps of any described methods.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

FIG. 6 is a schematic view of an example reactor that includes a header that mixes input feed with molten medium through bubbling.

FIG. 6A is a perspective view of an example parallel channel. FIG. 6B is a cross section through the example channel of FIG. 6A in a transverse plane perpendicular to a direction of flow of a molten medium.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
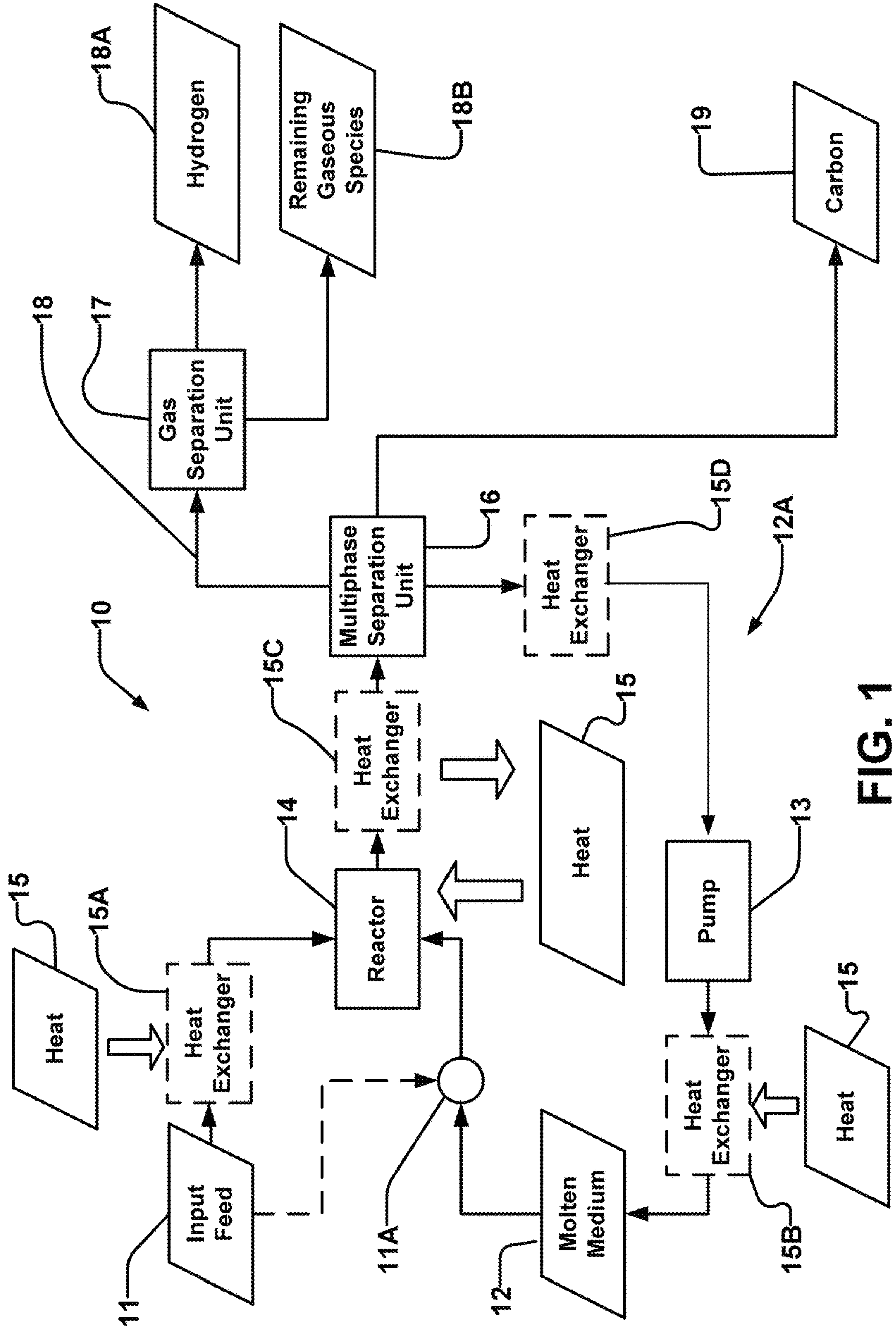
FIG. 1 is a block diagram of an example system for generating hydrogen by thermal cracking.

FIG. 1 depicts an example hydrogen production system 10. System 10 implements a thermal cracking process. System 10 takes in a hydrocarbon feedstock (e.g., methane, natural gas, treated natural gas (e.g., natural gas processed to remove impurities such as water, sulphur, etc.), other hydrocarbons or mixtures thereof) at input feed 11.

For methane, the thermal cracking process proceeds according to the equation:

$$CH_4 \rightarrow C(s) + 2H_2 \qquad (2)$$

$$\Delta H^\circ = 74.8\ kJ/\text{mol}$$

Thermal cracking of methane yields 0.25 kg of $H_2$ and 0.75 kg of carbon black per kg of $CH_4$ under stoichiometric conditions. No water is required and the byproduct is carbon in solid form. The carbon product may have a density in the range of about 1800-2100 kg/m$^3$. The produced carbon may be used in a wide variety of applications and industries such as tire manufacturing, lithium-ion battery electrodes, automotive components, and carbon-reinforced composite materials (Table 1).

TABLE 1

Example applications of carbon products in industry.

| Type of carbon | Types of applications |
|---|---|
| Carbon black | Tires, printing inks, high-performance coating and plastics |
| Graphite | Lithium-ion batteries |
| Carbon fiber | Aerospace, automobiles, sports and leisure, construction, wind turbines, carbon-reinforced composite materials, and textiles |
| Carbon nanotubes | Polymers, plastics, electronics, lithium-ion batteries |
| Needle coke | Graphite electrodes for electric and steel furnaces |

Thermal cracking of methane is an endothermic process. Temperatures in the range of about 800° C. to 1600° C. may be required. A temperature of 800° C. or lower may be sufficient for thermal cracking of a methane or other hydrocarbons in cases where a suitable catalyst is provided. In some embodiments, temperatures in the range of about 1200° C. to 1600° C. are applied in reactor 14. In some embodiments temperatures in the range of about 800° C. to 1100° C. are applied in reactor 14.

System 10 contacts the feedstock, which is supplied as input feed 11, with a molten medium 12. Molten medium 12 is maintained at a temperature sufficient for thermal cracking of the feedstock (e.g., by Equation (2)). Input feed 11 undergoes thermal cracking as it contacts molten medium 12. In some embodiments, molten medium 12 comprises a catalyst that catalyzes the thermal cracking reaction to facilitate one or more of: thermal cracking of input feed 11 at lower temperatures; more rapid completion of the thermal cracking of input feed 11; and more complete thermal cracking of input feed 11.

Molten medium 12 is pumped continuously or intermittently to cause molten medium 12 to flow around a loop 12A which includes a reactor 14 by a pump 13. Pump 13 may, for example, comprise a cantilever pump, a piston pump, an electromagnetic pump, an educator, or another pump that is suitable for service pumping hot molten medium 12. In general pump 13 may comprise any mechanism which causes circulation of molten medium 12 around loop 12A whether by applying mechanical forces to molten medium 12 (e.g. by a paddle, impeller, propeller, piston, variable volume container such as a bellows or the like) or applying forces in other ways such as by way of magnetic fields and/or electromagnetic fields that apply magnetic and/or electromagnetic forces to molten medium 12 or by using forces of gravity to circulate molten medium 12 (e.g. by lifting molten medium 12 to a higher elevation at some point in loop 12A and allowing the molten medium to flow due to gravitation) etc. Any practical device which can take in molten medium 12 at an inlet and output molten medium 12 at an outlet where the pressure of the molten medium is greater at the outlet than at the inlet may be used as a pump 13.

Pump 13 may comprise one or more separate pumps which may be at a single location or distributed around loop 12A.

In some embodiments pump 13 acts on a single phase (liquid) material. For example, pump 12 may be at a location in loop 12A where molten medium 12 is substantially free of any gas.

Heat 15 may be delivered into molten material 12 to keep molten material 12 liquid and to provide a desired temperature at one or more locations. For example, heat may be added to molten medium 12: upstream from reactor 14, at reactor 14, by preheating input feed 11 (e.g., by a heat exchanger 15A) and/or at a separate heat exchanger 15B.

In some embodiments one or more heaters is provided outside reactor 14 to maintain molten medium 12 at a temperature at which molten medium 12 can flow well through system 10 and an additional heater is provided in reactor 14. The additional heat provided in reactor 14 may raise molten medium 12 to an operating temperature sufficient to thermally crack hydrocarbon(s) in input feed 11. Heat input to reactor 14 may also supply the heat required by the thermal cracking reaction.

Pumping molten medium 12 through process loop 12A helps to reduce or eliminate carbon build up in reactor 14.

Circulating molten medium 12 through system 10 may help mix input feed 11 with molten medium 12, which may in turn increase the rate of the thermal cracking reaction. A high turbulence may help to increase the mixing of input feed 11 and molten medium 12.

Preferably, molten medium 12 is circulated with enough momentum so that the flow of molten medium, at least in reactor 14, is characterized by a Reynolds number ($Re_D$) of at least 3000 such that the flow is a turbulent flow. In general, the Reynolds number of a flowing fluid in a conduit can be expressed as:

$$Re_D = \frac{\rho D u}{\mu}, \tag{3}$$

where ρ is the density of the fluid, D is a characteristic length, u is the average velocity of the fluid and μ is the viscosity of the fluid. For a conduit with a circular cross-section (e.g., a tube) D is equal to the inner diameter of the respective conduit. For conduits with non-circular cross-sections, D is equal to the hydraulic diameter ($D_h$) where $$D_h = \frac{4A}{P},$$

where A is the cross sectional area of the conduit and P is the wetted perimeter of the cross section (the total perimeter of the conduit in contact with the fluid). For example where the cross-section of a conduit is rectangular, having a width W and a height H then D is equal to $$\frac{4WH}{2W + 2H}$$

which, in the case that W>>H (e.g., as in a parallel plate type conduit as described herein) is closely approximated by D=2H.

The example values for the Reynolds number provided herein are given for the case where molten medium 12 is flowing in reactor 14 without the addition of input feed 11. For the purpose of this disclosure and the appended claims, a Reynolds number value may be determined by Equation (3) while setting ρ to be the density of molten medium 12, setting μ to be the viscosity of molten medium 12, and setting u to be the velocity that molten medium 12 would have with no input feed 11 and the same flow rate of molten medium 12.

The addition of input feed 11 creates a nonhomogeneous mixed fluid (i.e. a mixed fluid made up of liquid molten medium 12 and bubbles of gaseous input feed 11) that flows in reactor 14. This mixed fluid may have a density that is lower than that of molten medium 12 (because of the presence of less dense bubbles of input feed 11). Since the Reynolds number is proportional to both density and velocity, for the same flow rate of molten medium 12, the introduction of input feed 11 to create a mixed fluid in reactor 12 tends not to have a very significant effect on the Reynolds number.

In some embodiments, the momentum of molten medium 12 creates turbulence with $Re_D$ in the range of 30000-100000000. This may be considered to be a "high turbulence" regime. In some embodiments, flow of molten medium 12 at least in reactor 14 is characterized by a high turbulence in which $Re_D$ is greater than 60000 when the flow velocity is 0.1 m/s and the temperature of molten medium 12 is 1000° C. A high turbulence (e.g., turbulence with a Reynolds number of at least 3000) may help to reduce or avoid deposition of carbon on surfaces within reactor 14.

In preferred embodiments, molten medium 12 is continuously circulated through system 10 by pump 13. Continuous circulation of molten medium 12 advantageously minimizes thermal shock and vibration. The speed at which pump 13 pumps molten medium 12 may be varied.

In some embodiments, pump 13 is controlled to circulate molten medium 12 intermittently. Intermittent circulation may be advantageous where hydrogen demand is low relative to the capacity of system 10 to produce hydrogen. Where hydrogen demand is low, the rate at which input feed 11 is supplied to system 10 may be reduced. In response, pump 13 may be operated intermittently or at a lower speed to uphold the efficiency and operating costs of system 10. It is preferred for pump 13 to be operated at a reduced speed in such situations.

In some embodiments, molten medium 12 comprises:

- a liquid metal (which may be a single element or a metal alloy);
- a molten salt;
- a combination thereof.

In some embodiments, molten medium 12 has one or more or all of the following characteristics:

- a melting point of 600° C. or less;
- a boiling point of 1000° C. or more;
- a density in the range of about 5000 to 8000 kg/m$^3$;
- a low viscosity (e.g., a dynamic viscosity of 0.2-20 mPa·s or less at the operating temperature of molten medium 12);

- low vapor pressure (e.g., a vapor pressure of 200 Pa or less at the operating temperature of molten medium 12);
- high surface tension at the operating temperature of molten medium 12 (e.g., a surface tension of at least 300 mN/m);
- low tendency to dissolve hydrogen (e.g., a solubility for hydrogen at the operating temperature of molten material 12 of $50\times10^{-2}$ $mL_{STP}/g_{metal}$ or less (where $mL_{STP}$ is the volume of dissolved hydrogen at standard temperature pressure of 0° C. and 1 atm);
- high heat capacity (e.g., a specific heat capacity $C_p$ of at least 250 J/kg·K);
- high thermal conductivity (e.g., a thermal conductivity of at least 20 W/(m·K)); and
- high thermal diffusivity (where thermal diffusivity is the thermal conductivity divided by density and specific heat capacity at constant pressure (e.g., a thermal diffusivity of at least $1\times10^{-5}$ $m^2/s$)).

Factors to consider when selecting a composition for molten medium 12 may include cost and stability under the operating conditions of system 10.

Choosing a composition of molten medium 12 that has a low vapor pressure at the operating temperature of system 10 helps to make system 10 safe.

Choosing a composition of molten medium 12 that has a high thermal mass (where thermal mass is the density of a material multiplied by the specific heat capacity of the material at a constant pressure) helps to minimize temperature gradients in molten medium 12. For example, a molten medium 12 that has a high thermal mass can reduce radial and axial temperature gradients in conduits of reactor 14 while providing sufficient heat for the thermal cracking reaction to occur. This may in turn allow for conduits 24 with larger dimensions (e.g., length, width, height, diameter) to be used within reactor 14 without adversely affecting the kinetics of the thermal cracking reaction.

In some embodiments, molten medium 12 comprises liquid tin. Liquid tin is advantageously chemically stable within system 10 and has desirable properties including:

- melting point of 231.9° C.;
- boiling point of 2602° C.;
- density of 6460 $kg/m^3$ at 1000° C.;
- viscosity of 0.72 mPa·s at 1000° C.;
- vapor pressure of 132 Pa at 1492° C.;
- surface tension of about 500 mN/m when in contact with an alumina ($Al_2O_3$) substrate, in an inert medium, at 1000° C.;
- hydrogen's solubility in liquid tin is $0.39\times10^{-2}$ $mL_{STP}/g_{metal}$;
- thermal mass of 2017 kJ/($m^3$·K) at 1000° C.; and
- thermal conductivity of 50.4 W/(m·K) at 1000° C.

In some embodiments, molten medium 12 comprises a suitable salt. Suitable salts advantageously:

- have some catalytic effects that may accelerate the thermal cracking process; and
- tend to be less expensive than liquid metals.

The salts selected for molten medium 12 may be selected to avoid salts that are unstable under the operating conditions of system 10 and salts in which hydrogen is undesirably soluble.

In some embodiments, molten medium 12 comprises a mixture of molten salt and liquid metal. For example, molten medium 12 may comprise a molten salt and a liquid metal where the molten salt has a lower density than the liquid metal. Such a mixture may help to minimize the loss of liquid metal with carbon black removed in separation unit 16 of system 10. For example, the carbon black may be floated through a layer of molten salt before it is separated from molten medium 12.

In some embodiments, residual amounts of salt that is removed with the carbon black may be washed away (e.g., with water) to clean the carbon black. The resulting brine (after washing the carbon black) may be treated to remove the salt and may optionally be recycled. Other methods may also be applied to reduce contamination of the carbon black by molten medium 12 or any of its constituents.

Molten medium 12 may, for example, comprise any one or combination of:

- Pb
- Sn
- In
- Bi
- Ga
- Ag
- $NiMo/Al_2O_3$
- 17% Cu—Sn
- Liquid platinum alloys e.g.:
  - 17% Pt—Sn
  - 17% Pt—Bi
  - 62% Pt—Bi
- Liquid nickel alloys:
  - 17% Ni—In
  - 17% Ni—Sn
  - 73% Ni—In
  - 17% Ni—Ga
  - 17% Ni—Pb
  - 17% Ni—Bi
  - 27% Ni—Au
  - 27% Ni—Bi
- LiCl
- KCl
- KBr
- NaBr In some embodiments, molten medium 12 further comprises solid particles. The solid particles may, for example, comprise a catalyst for the thermal cracking reaction. For example, the solid particles may comprise one or both of nickel and platinum. The solid particles may, for example, comprise a powder mixed into molten medium 12. As the size of solid particles are made smaller, the contact area between the solid particles and input feed 11 tends to increase. Thus the rate of the thermal cracking reaction may be increased by providing smaller particles that include a catalyst and/or by increasing the amount of solid particles in molten medium 12. Such particles may help by catalyzing the thermal cracking reaction and/or by helping to scour carbon black from surfaces interior to system 10. In some embodiments, the solid particles have a density that is about the same as the density of molten material 12.

The operating temperature of system 10 may be selected based on factors such as the presence or absence of a catalyst, the nature of the feedstock, the makeup of molten medium 12 and the optimum temperature for thermal cracking of the feedstock. Molten medium 12 may be heated and kept at or near a desired operating temperature at which molten medium 12 is a liquid. In some embodiments, the operating temperature is at least 600° C. or at least 800° C.

In some embodiments, molten medium 12 has temperatures in the range of 500° C. to 1200° C. or the range of 900° C. to 1100° C. or at least 800° C. in parts of system 10 where the thermal cracking process occurs.

In some embodiments, the temperature of molten medium 12 is hotter in some parts of loop 12A than in other parts of loop 12A. In some embodiments, molten medium 12 is cooled prior to entering parts of loop 12A in which high temperatures are not required. For example, the temperature of molten medium 12 may be reduced (e.g., by a heat exchanger which removes heat from molten medium 12) after molten medium exits reactor 14 and prior to molten medium entering pump 13.

In some embodiments, molten medium 12 is cooled to a temperature within a rated operating temperature range of pump 13 before molten medium 12 enters pump 13. Molten medium 12 may, for example, be cooled at a heat exchanger installed upstream of pump 13, for example heat exchanger 15D. Cooling molten medium 12 may increase the longevity of pump 13. Cooling molten medium 12 may reduce maintenance required for pump 13.

In some embodiments, molten medium 12 has a temperature in pump 13 that is at least 50° C. or at least 100° C. lower than the temperature of molten medium 12 exiting reactor 14.

In some embodiments, molten medium 12 in system 10 has a pressure greater than atmospheric pressure at least in reactor 14.

Input feed 11 and molten medium 12 are input to reactor 14. Input feed 11 may be injected into molten medium 12 upstream from reactor 14 and/or within reactor 14. In some embodiments, input feed 11 is pressurized to a pressure above atmospheric pressure. In some embodiments, input feed 11 is pressurized to a pressure, above atmospheric pressure, that overcomes hydrostatic pressure in reactor 14. In some embodiments, input feed 11 and molten medium 12 are mixed together prior to entering reactor 14, as indicated at 11A. In some embodiments, input feed 11 is input directly into reactor 14.

The temperature of input feed 11 is not critical because in general, input feed 11 has a much lower thermal mass than molten medium 12. For example, input feed 11 may have a temperature in the range of −60° C. to 1600° C. Input feed 11 may, for example, be provided as a direct feed from a natural gas processing and treatment plant. Preferably, the temperature of input feed 11 is in the range of about 25° C. to 1100° C.

In some embodiments, input feed 11 is preheated prior to entering reactor 14. For example, heat exchanger 15A may transfer heat to input feed 11 from any one or combination of:

- molten medium 12 (e.g., taken between multiphase separation unit 16 and pump 13);
- gaseous species 18 separated by multiphase separation unit 16 (gas species 42);
- post-reaction mixture 41;
- combustion gases obtained from combustion of other gases 18B and/or some of hydrogen 18A;
- combustion gases from other sources;
- exhaust gases from reactor 14 (e.g., heated fluid 32) and/or other sources of flue gas or other hot exhaust gases;
- other heat sources, e.g., solar, waste heat from industrial processes; etc.

Through contact with molten medium 12, input feed 11 is converted at least partially into hydrogen 18A and carbon 19. This conversion may, for example proceed according to Equation 2. Advantageously the thermal cracking of input feed 11 to generate hydrogen and carbon may occur primarily in the bulk of molten medium 12. For example at least 65% or 75% or 85% or 90% of the thermal cracking may occur in the bulk of the molten medium. Contact of input feed 11 with surfaces of conduits 24 is not required to facilitate the thermal cracking. In some embodiments very little (e.g. a few percent or less) of carbon black is generated at surfaces of conduits 24.

The mixture of molten medium 12, any remaining input feed 11, hydrogen and carbon (hereafter referred to as post-reaction mixture 41) is delivered to multiphase separation unit 16. Post-reaction mixture 41 is optionally cooled (e.g., by a heat exchanger 15C) prior to entering multiphase separation unit 16.

Multiphase separation unit 16 operates to separate one or more components of post-reaction mixture 41. The separation may be based on density. Multiphase separation unit 16 separates gaseous species, such as any remaining input feed 11, hydrogen and other gases from post-reaction mixture 41. Multiphase separation unit 16 further separates molten medium 12 and carbon 19. At least a portion of molten medium 12 is recirculated around loop 12A by pump 13.

Separated gases may be delivered to a gas purification unit 17. Prior to gas purification unit 17, the collected gases are optionally cooled. Gas purification unit 17 separates hydrogen 18A from other gases 18B. The other gases 18B may be recycled. For example, the other gases may be recycled into input feed 11. In some embodiments, the other gases 18B include combustible gases that are burned to generate heat 15 for heating system 10.

System 10 may advantageously provide a relatively fast thermal cracking reaction because the flowing molten medium 12 may transfer heat to incoming input feed 11 at a high rate. The flow of molten medium 12 may help to prevent buildup of carbon black or other solids in system 10. This can help to maintain efficient transfer of heat 15 into molten medium 12.

Reactor 14 may, for example, comprise a plurality of conduits 24 through which a mixture of molten medium 12 and input feed 11 may be passed. Conduits 24 may be heated (e.g., by passing through a heated gas or liquid).

Pump 13 develops pressure in molten medium 12 that allows reactor 14 to be operated vertically, horizontally, or at any arbitrary angle. A vertically oriented reactor 12 may be compact. However, pumping molten medium 12 against the hydrostatic pressure in a vertical reactor may increase the required pumping power. For example, where molten medium 12 comprises liquid tin, the hydrostatic pressure due to the weight of liquid tin at the bottom of a 3 m long vertical tube is about 190 kPa. Orienting reactor 14 horizontally substantially eliminates pumping energy required to overcome the hydrostatic pressure of molten medium 12.

Figure 2:
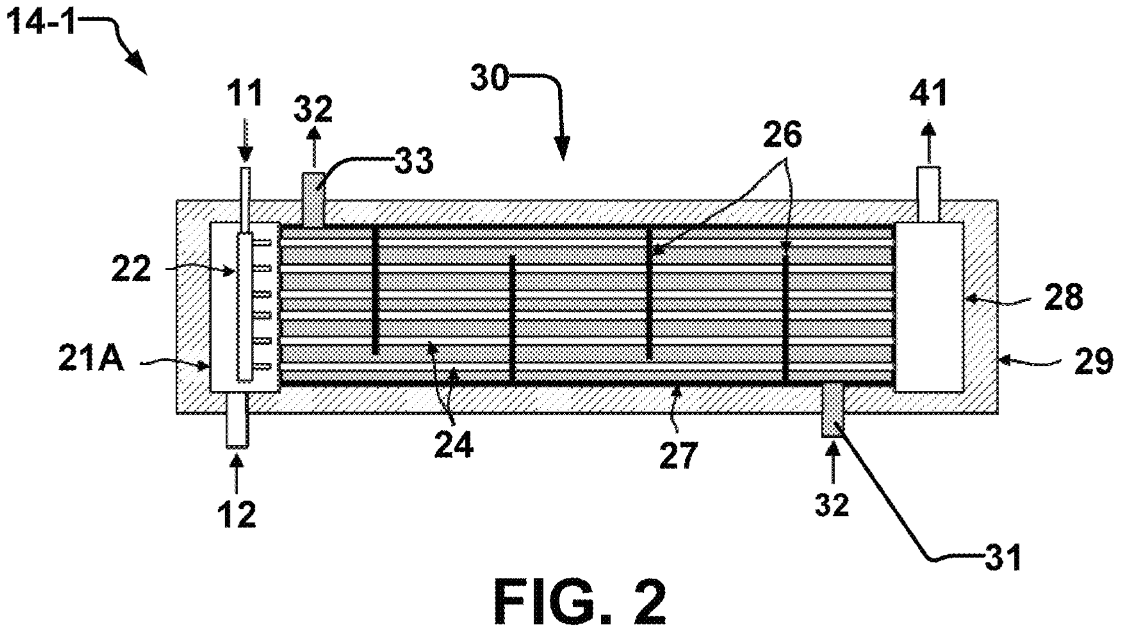
FIG. 2 is a schematic view of an example reactor that includes a header that mixes input feed with molten medium through injection.

FIG. 2 schematically depicts an example reactor 14-1 that may be used as reactor 14 in FIG. 1. Reactor 14-1 receives input feed 11. In reactor 14-1, input feed 11 is mixed with molten medium 12 in header 21A. In some embodiments, input feed 11 is mixed with molten medium 12 through injection. Input feed 11 may be injected through a distributor 22. The distributor may, for example, comprise one or both of nozzles and perforated pipe(s) or a bubble generator (see FIG. 6). In general, input feed 11 is mixed into molten material 12 by a suitable gas liquid contactor which may be part of reactor 14 or located upstream from reactor 14. The mixture of molten medium 12 and input feed 11 is carried through heated conduits 24 of reactor 14-1. Conduits 24 provide passages through which molten medium 12 can flow. In reactor 14-1, conduits 24 comprise tubes. In other example embodiments, conduits 24 may comprise parallel conduits.

Reactor 14-1 comprises collector 28 on the end opposing header 21A. Collector 28 is connected to receive molten medium 12 that has passed through conduits 24. Collector

28 may be connected to conduits 24, for example by one or more of joining pipes and welds. Collector 28 collects post-reaction mixture 41. Collector 28 outputs post-reaction mixture 41 to multiphase separation unit 16. Post-reaction mixture 41 may be cooled prior to multiphase separation unit 16. Post-reaction mixture 41 is optionally cooled by a heat exchanger 15C before being delivered to multiphase separation unit 16 (see FIG. 1).

One or more of the inner walls of conduits 24, header 21A and collector 28 and/or any surfaces in contact with molten medium 12 may comprise a coating. The coating may be selected to increase the longevity of conduits 24. The coating may be selected to provide corrosion resistance. The coating may, for example, comprise one or more of alumina, silicon carbide, zirconium oxide, tungsten carbide, graphite, molybdenum, other ceramics, and/or other metals.

A coating on inner walls of conduits 24 optionally comprises a material that is catalytic for the thermal cracking reaction. Catalytic materials may, for example, comprise one or both of nickel and platinum based catalysts.

Conduit bundles 25 are connected to header 21A. Conduit bundles 25 may, for example, be connected to header 21A by welding or joining pipe(s). Header 21A distributes molten medium 12 to conduit(s) 24. Preferably, molten medium 12 is equally distributed among conduits 24. To effectively equally distribute molten medium 12 among conduits 24, the pressure drop along different ones of conduits 24 should remain similar.

In conduits 24, input feed 11 is converted to hydrogen and solid carbon by thermal cracking. It is desirable to minimize the dwell time of the produced hydrogen in reactor 14. Minimizing the dwell time of the produced hydrogen in reactor 14 minimizes the opportunity for the produced hydrogen to participate in other chemical reactions within reactor 14. As such, minimizing the dwell time of the produced hydrogen within reactor 14 may reduce production of intermediary products of the thermal cracking process. Depending on the composition of input feed 11, intermediary products could, for example include ethylene and acetylene.

Conduits 24 are preferably made out of a material capable of withstanding contact with molten material 12 at the operating temperature of system 10 (for example temperatures on the order of 1200° C.). Conduits 24 may, for example be made out of a material capable of withstanding contact with molten material 12 at temperatures of about or more than 1400° C. Conduits 24 may, for example, be made of one or more of stainless steel 310, stainless steel 316, nickel alloys, Inconel, Hastelloy and tungsten.

Conduits 24 may be grouped in conduit bundles 25 (see e.g., FIGS. 3A, 3B, 3C and 3D). Each conduit bundle 25 comprises one or more conduit(s) 24. A conduit bundle 25 may comprise 1 to 10000 conduits 24. Conduit bundles 25 are housed inside a shell 27.

Conduits 24 may have a cross-sectional shape in the direction transverse to the flow of molten medium 12 that has any suitable geometry. For example, without limitation, the cross-sectional shape(s) of conduits 24 may be circular, elliptical, annular, rectangular, square triangular, any other suitable shapes etc. Conduit bundles 25 and shell 27 may also have a cross-sectional area in the direction transverse to the flow of molten medium 12 in any suitable geometry. For example, as with conduits 24, conduit bundles 25 and shell 27 may have cross-sectional areas that are circular, elliptical, annular, rectangular, etc. Different conduits 24 optionally have different cross sectional shapes. The cross sectional shapes of conduits 24 optionally can vary along the lengths of conduits 24.

In some embodiments, conduits 24 comprise suitable tubes or pipes. Conduits 24 may comprise tubes with circular cross-sections. FIG. 3A is a cross-section of a conduit bundle 25 where conduits 24 comprise tubes that have a circular cross-section. Conduits 24 may comprise tubes that have a rectangular cross-section. FIG. 3B is a cross-section of conduit bundle 25 where conduits 24 comprise tubes that have rectangular cross-sections.

In some embodiments conduits 24 have the form of annular spaces defined between concentric tubes. FIG. 3C is a cross-section of an example conduit bundle 25 in which conduits 24 comprise spaces between concentric tubes.

In some embodiments, conduits 24 are defined between pairs of parallel plates. Such conduits may be called “parallel channels” or “parallel conduits” FIGS. 6A and 6B illustrate an example parallel channel 24. Parallel channels may, for example be defined between pairs of parallel flat plates 24A. The edges of each parallel flat plate 24A may touch shell 27 on opposing sides. Edges of parallel channels are optionally provided by portions of shell 27.

A cross section of a parallel channel 24 in a plane transverse to the flow direction of molten medium 12 (see e.g. FIGS. 6A and 6B) may have a high aspect ratio (e.g. a thickness of the parallel channel—denoted by D1 in FIG. 6B—may be significantly smaller than a breadth of the cross section—denoted by D2 in FIG. 6B. D1 may also be significantly smaller than a length D3 of the parallel channel in a direction of the flow of molten medium 12 (see FIG. 6A).

D2 may, for example, exceed D1 by a factor of 10, 20, 40 or more giving an aspect ratio of the cross section (D2:D1) of 10:1, 20:1, 40:1 or more. D1 may, for example, be defined by the spacing between adjacent plates 24A. D2 may, for example be defined by a width of shell 27 or a distance between other side members that close edges of a parallel channel 24. In a parallel channel, molten medium 12 may flow primarily as a two dimensional flow through between parallel plates 24.

Figure 3D:
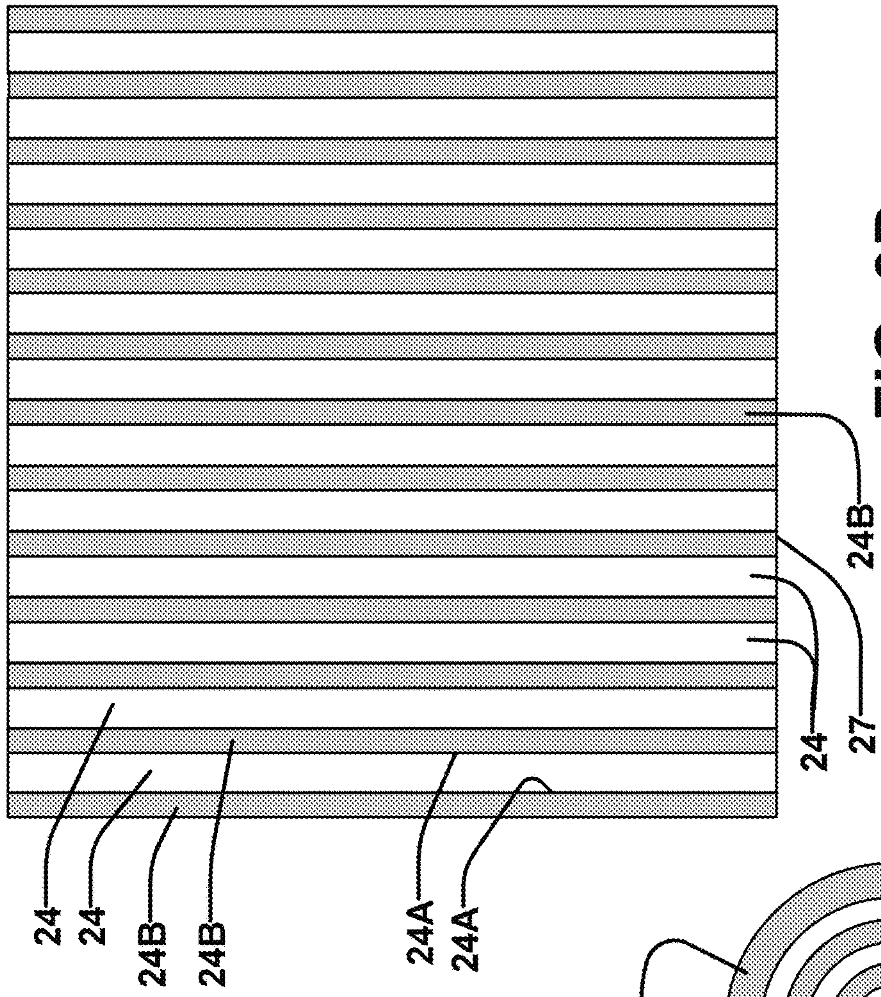
FIGS. 3A-3D are schematic diagrams of example cross-sections of a conduit bundle.
Figure 3C:
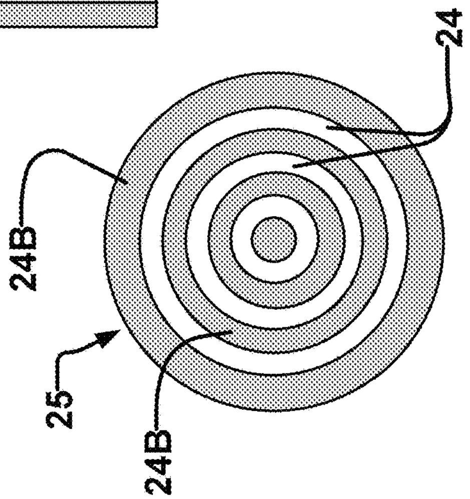
Figure 3A:
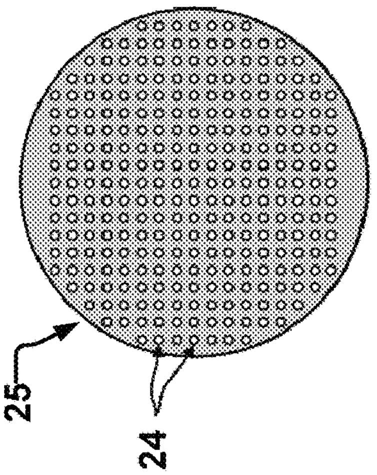
Figure 3B:
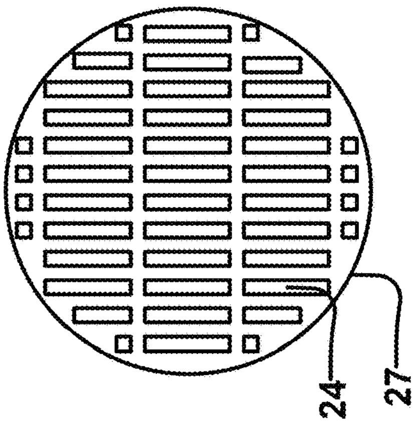

FIG. 3D is an example elevation cross-section of a conduit bundle 25 in which conduits 24 comprise parallel channels. Heat may be delivered into molten medium 12 in channels 24 by a hot fluid that is introduced into spaces 24B between the parallel channels 24.

Characteristics of conduits 24 can affect the conversion rate of input feed 11 to hydrogen and carbon. For example, the dimensions (e.g., one or more of diameter, length, height, width) and material of conduits 24 impact the rate of heat transfer to input feed 11 and the dwell time of input feed 11 in reactor 14. The heat transfer rate and the dwell time affect the conversion rate from input feed 11 to hydrogen.

Maximizing the heat transfer rate and the dwell time can increase the methane to hydrogen conversion rate. For example, conduits 24 that are 3-4 meter long stainless steel pipes, schedule 40 with ¾" nominal diameter may be used to achieve a methane to hydrogen conversion rate of 50% under a methane flow rate of 0.4 kg/h and reactor operating temperature of 1050° C.

In preferred embodiments, conduits 24 are made with the largest dimensions (i.e. length and one or more of diameter, width and height) that can maintain the temperature of the mixture through reactor 14. Where conduits 24 comprise tubes, the diameter of conduits 24 may, for example, be in the range of ¼" to 5". Where conduits 24 comprise tubes, the diameter of conduits 24 is preferably in the range of ¾" to 2".

The length of conduits 24 may be selected based on the temperature of reactor 14, the flow rate of input feed 11, the surface contact area between the bubbles of input feed 11 and molten medium 12, and the composition of molten medium 12. For example, where molten medium 12 is liquid tin and the temperature of reactor 14 is 1000° C., to provide a methane to hydrogen conversion rate of more than 60%, the conduits 24 of reactor 14-1 should be 3.5-4 m, preferably 3.6 m long.

A heated fluid is delivered into shell 27. Heat from the heated fluid is transferred to molten material 12 through the walls of conduits 24. The heat provides energy for the thermal cracking reaction. To reduce heat transfer to the environment, reactor 14 may be insulated with insulation 29. Insulation 29 may, for example, comprise a high-temperature insulation. Insulation 29 may comprise ceramic fiber insulation.

In the example reactor 14-1 the heated fluid is provided by a heating system 30. Heating system 30 may, for example burn natural gas, hydrogen, a mixture of hydrogen and natural gas or other combustible material to generate the heated fluid 32. Other options for heating system 30 include electric heaters, plasma heaters, induction heaters, solar heaters or other heaters capable of heating fluid 32 to suitably high temperatures (e.g., temperatures at or above the operating temperature of molten medium 12).

Heated fluid 32 enters shell 27 at one or more ports 31. Inside shell 27, Heated fluid 32 is distributed through reactor 14 to contact outsides of conduits 24.

Preferably, heated fluid 32 is distributed through reactor 14 such that there is a uniform or near uniform temperature distribution across conduit bundles 25, across conduits 24 and a minimum temperature gradient along conduits 24. Baffles 26 may be provided inside shell 27 to control the flow and/or distribution of heated fluid 32. Baffles 26 may mechanically support conduits 24. Heating fluid 32 leaves shell 27 of reactor 14 through one or more output ports 33.

Upon departure from shell 27, heated fluid 32 may be used elsewhere in system 10. For example, heated fluid 32 may be used to heat exterior surfaces of one or more of pump 13, multiphase separation unit 16, other pipes, other valves, and other exterior surfaces of system 10.

Where conduits 24 are parallel channels, heated fluid 32 may be distributed in spaces 24B between the parallel channels with an appropriate arrangement of input ports 31 and output ports 33. In some embodiments, individual spaces 24B between parallel channels 24 may have their own respective input port(s) 31 and output port(s) 33).

The distribution and flow of heated fluid 32 inside shell 27 may be configured to maximize the rate of conversion of input feed 11 to hydrogen and carbon black. For example, the distribution and flow of heated fluid 32 inside shell 27 may be arranged relative to the flow pattern of molten medium 12 in conduits 24 to maintain an optimal temperature for the thermal cracking reaction in conduits 24 of reactor 14. In some embodiments, heated fluid 32 proceeds through reactor 14 in a direction that is countercurrent to the flow of molten medium 12 in channels 24 such that the heated fluid 32 first transfers heat to molten medium 12 that is about to leave channels 24 and subsequently transfers heat to molten medium 12 that is entering channels 24.

Figure 4A:
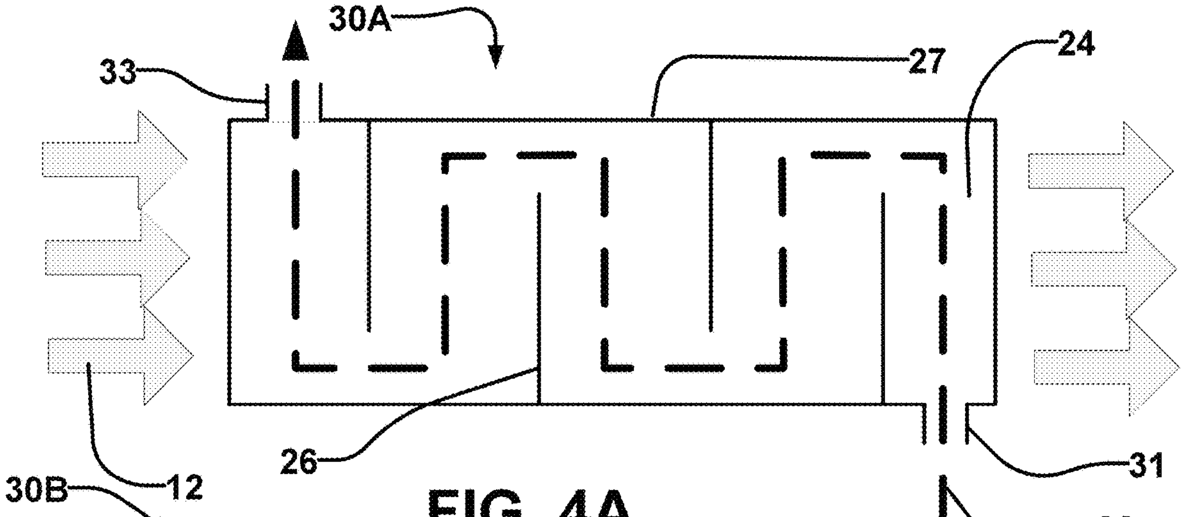
FIGS. 4A-4C are schematic diagrams of example heating flow patterns for a reactor's heating system.

Example flow patterns for heated fluid 32 include: countercurrent-flow, cross-flow and parallel-flow configurations and combinations of these. In countercurrent-flow configuration, heated fluid 32 predominantly flows in a direction opposite to the flow of the mixture of molten medium 12 and input feed 11 in conduits 24. In such embodiments, input port(s) 31 may be arranged near collector 28 and output port(s) 33 may be arranged near header 21A. FIG. 4A depicts an example heating system 30A with countercurrent-flow configuration, with baffles 26 that direct the flow within shell 27.

Figure 4B:
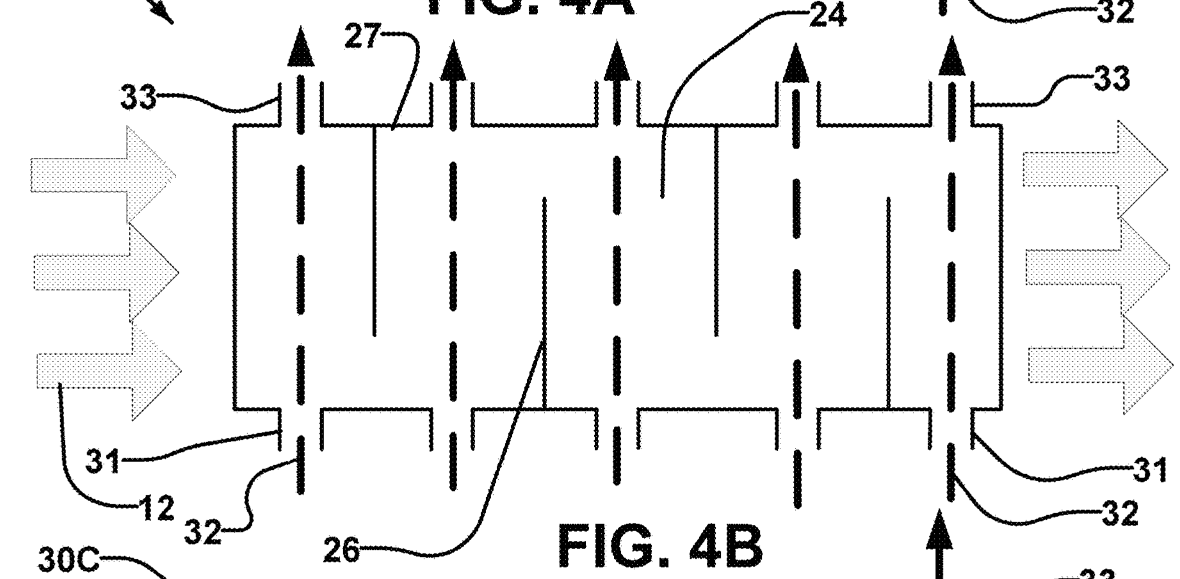

In cross-flow configurations, heating fluid 32 flows predominantly in a direction transverse to conduits 24. In such embodiments, input port(s) 31 and output port(s) 33 may be placed at matching positions on opposing sides of reactor 14 (e.g., an input port and a corresponding output port such that a line drawn between an input port and a corresponding output port, is approximately perpendicular to the longitudinal direction of the reactor). FIG. 4B depicts an example heating system 30B with cross-flow configuration.

Figure 4C:
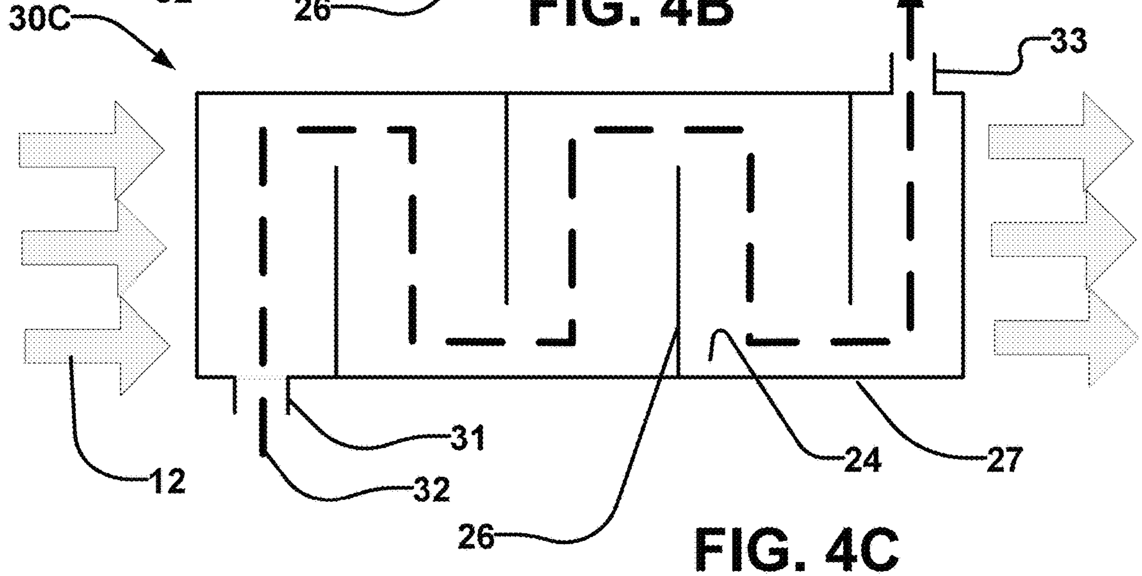

In parallel-flow configurations, heating fluid 32 flows predominantly in the same general direction as the mixture of molten medium 12 and input feed 11 in conduits 24. In such embodiments, input port(s) 31 may be arranged near header 21A and output port(s) 33 may be arranged near collector 28. FIG. 4C depicts an example heating system 30C with parallel-flow configuration, with baffles 26 that direct the flow within shell 27.

Between countercurrent-flow, cross-flow and parallel-flow configurations, the countercurrent-flow configuration advantageously tends to maintain the largest temperature gradient (and therefore the highest rate of heat transfer) between heated fluid 32 and the mixture of molten medium 12 and input feed 11 in conduits 24. Such temperature gradient maximizes the heat transfer effectiveness, defined as the ratio of the actual heat transfer rate to the maximum heat transfer rate possible in reactor 14. A consistent temperature gradient also helps to reduce thermal stress in the materials of reactor 14.

In some embodiments, reactor 14-1 comprises fins on the inside and/or outside surfaces of conduits 24. Fins may increase heat transfer between heated fluid 32 and molten medium 12 and thereby may increase the conversion rate of input feed 11 to hydrogen and carbon. Fins inside conduits 24 may also help to improve the mixing of input feed 11 with molten medium 12.

Fins may extend along conduits 24 in a continuous, intermittent, or staggered fashion. Fins may extend circumferentially or helically around an outside surface of conduits 24. Fins may, for example be any one of or any combination of rectangular, trapezoidal, triangular and elliptical in shape.

Shell 27 is made of materials rated to withstand the temperature of heated fluid 32 with a suitable safety factor. Shell 27 may, for example be made of suitable metallic or non-metallic materials such as stainless steel alloys, nickel alloys, cast iron, refractory bricks, ceramics, and carbon graphite blocks. In some embodiments, shell 27 is made of one or more of stainless steel 310, stainless steel 316, nickel alloys, Inconel and Hastelloy.

Figure 5C:
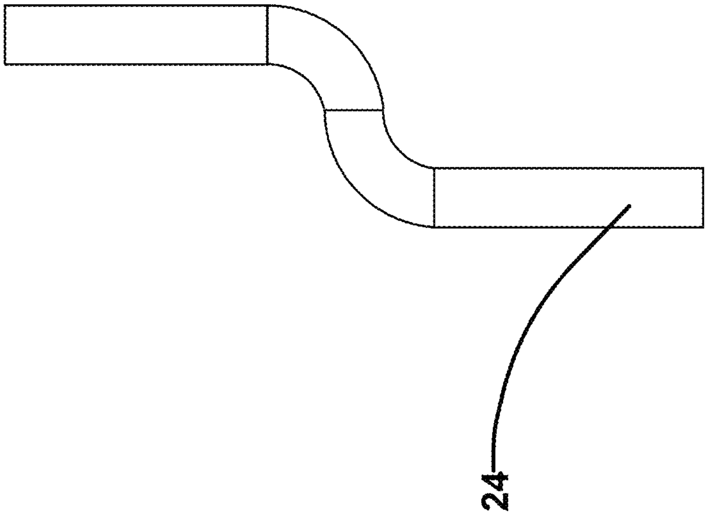
FIGS. 5A-5C are schematic diagrams of example conduit arrangements to accommodate for thermal expansion.
Figure 5B:
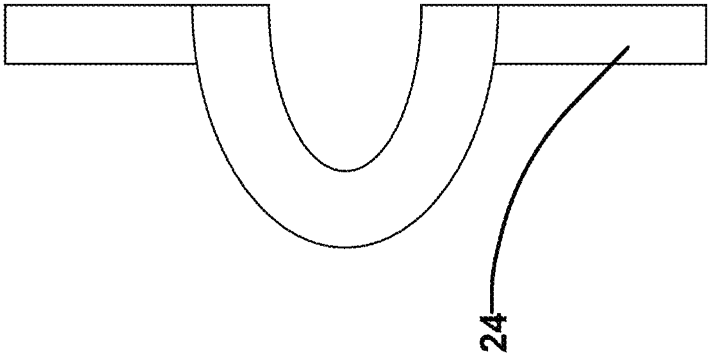
Figure 5A:
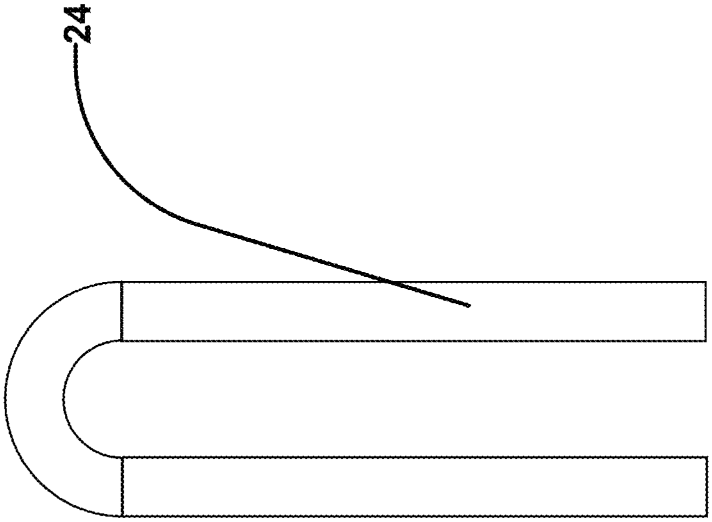

Reactor 14 may be constructed to avoid problems which could be caused by differential expansion of components of reactor 14 as reactor 14 is brought to operating temperature. Construction techniques for accommodating thermal expansion may include one or more of:

- making some or all components of reactor 14 using materials that have relatively small coefficients of thermal expansion (e.g., a thermal expansion of less than 2% of the material's length when temperature is changed between room temperature and 1800° C.).

designing conduits 24 to accommodate thermal expansion, e.g., by bending conduits 24. For example, in some embodiments, conduits 24 are bent by 180° into hairpin shapes (see FIG. 5A). As another example, conduits 24 may be bent to include 90 degree bends to accommodate expansion. Such bent conduits 24 may expand freely without stressing welded and fixed joints. In some embodiments, conduits 24 are connected to a U-shaped pipe (see FIG. 5B). In some embodiments, conduits 24 are bent less than 90° to allow for thermal expansion of conduits 24 (see FIG. 5C).

incorporating one or more expansion joint(s) in shell 27 (to allow relative movement of ends of shell 27). The use of expansion joints is a conventional practice in the design of shell and tube heat exchangers where the shell and tubes have different thermal expansion rates.

In embodiments where shell 27 is made up of material with a thermal expansion of less than 2% for a temperature change from 25° C. to 1800° C., one or both ends of conduits 24 may be connected to a U-shaped pipe. The U-shaped pipe may flex to allow for thermal expansion of conduits 24.

In some embodiments, input feed 11 is mixed into molten medium 12 by bubbling input feed 11 through small apertures into molten medium 12. In such embodiments input feed 11 may be bubbled through a bubble generator which serves as a gas liquid contactor. The bubble generator may, for example, comprise one or more of a sparger, rotary degasser, sintered metal sparger, porous metal member (e.g., a porous metal disk) and porous ceramic member (e.g., a porous ceramic disk). Input feed 11 may be bubbled into molten medium 12 prior to reactor 14 or within reactor 14.

FIG. 6 depicts another example reactor 14-2 that may be used for reactor 14 in system 10 of FIG. 1. Reactor 14-2 may have a construction that is the same or similar to that of reactor 14-1 (FIG. 2) except that Reactor 14-2 includes a header 21B that includes a bubble generator 23. Input feed 11 is bubbled into reactor 14-2 at bubble generator 23.

In some embodiments, bubble generator 23 comprises a rotary degasser. The rotary degasser generates bubbles through continuous rotation. In some embodiments, bubble generator 23 comprises one or both of porous ceramics and spargers. The pore size of the porous ceramics and/or spargers directly correlates with the size of the bubbles. For example, the pores may have an average diameter of 50 microns or less to yield bubbles that have diameters of 50 microns or less. In some embodiments, a bubble generator comprises a porous metal or ceramic material or a sparger having pore sizes in the range of about 2 microns to about 50 microns.

The produced bubbles of input feed 11 may vary in diameter. Bubbles may, for example have diameters in the range of about 1 micron to 5 millimeters. The surface area of input feed 11 in contact with molten medium 12 may advantageously be increased by dividing input feed 11 into a larger number of smaller bubbles.

It is advantageous for the bubbles of input feed 11 to be small and for conduits 24 to have relatively large dimensions (e.g., length, width, height, diameter) while maintaining a suitably uniform temperature distribution across conduits 24 and a low temperature gradient along conduits 24. Providing the same amount of input feed 11 in the form of more, smaller, bubbles can generally improve performance of reactor 14. Making the bubbles small relative to the dimensions of conduits 24 may advantageously preserve molten medium 12 as a continuous fluid in reactor 14 while the bubbles are discrete and form a discontinuous phase within molten medium 12. In some embodiments, the bubbles have sizes that are at least a factor of 25 or at least a factor of 250 or at least a factor of 1000 or at least a factor of 4000 or at least a factor of $10^6$ smaller in area than a cross sectional area of a passage in the reactor within which the mixed molten medium and hydrocarbon is flowed through the reactor.

Bubble coalescence tends to reduce the surface area of input feed 11 in contact with molten medium 12. It is advantageous to increase the surface area of input feed 11 in contact with molten medium 12. Microbubbles, bubbles 1 to 50 microns in diameter, aid bubbles to disperse in molten medium 12 and to reduce coalescence between bubbles. Having a uniform distribution of bubbles through molten medium 12 correlates with having consistent hydrogen production.

Figure 7:
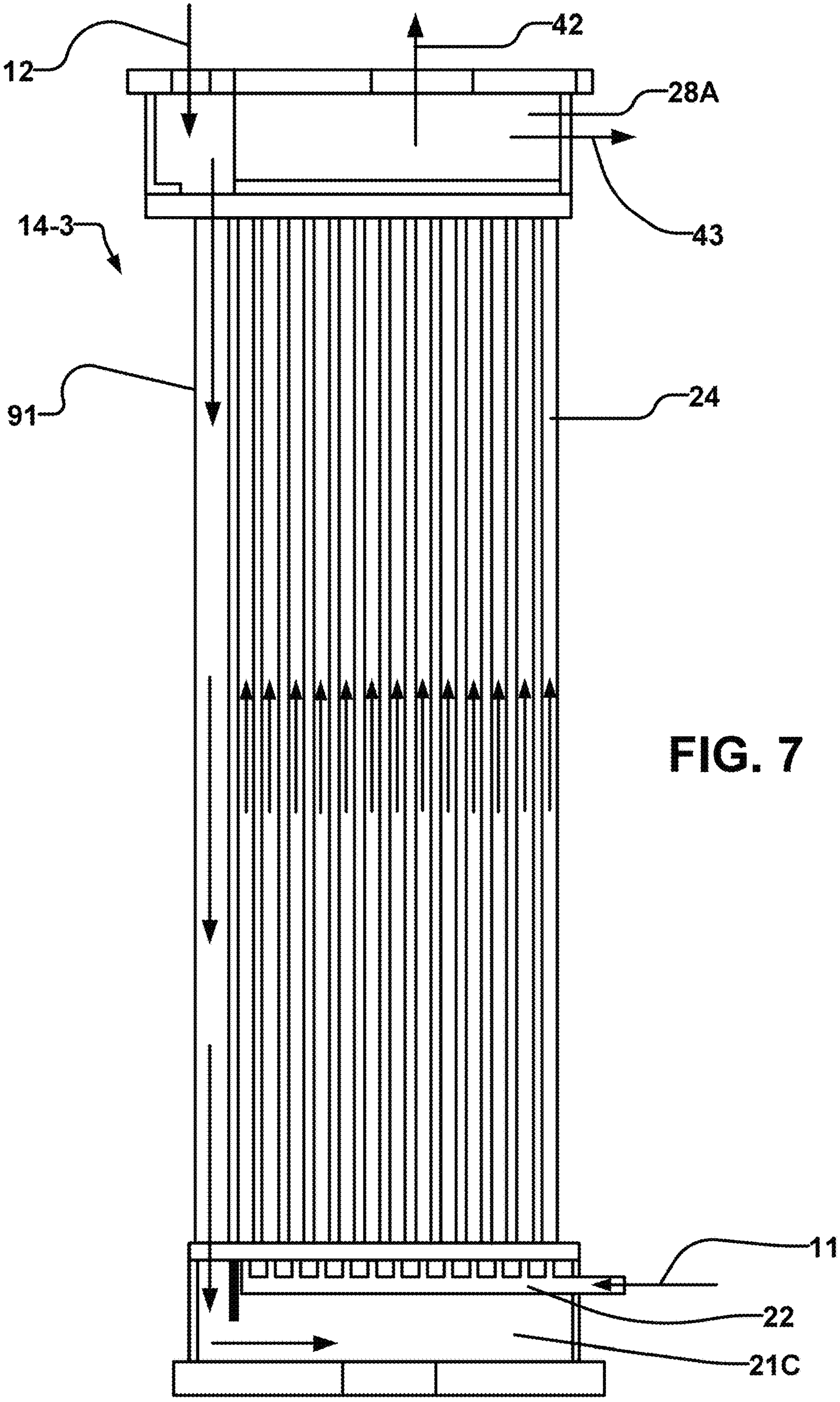
FIG. 7 is a schematic view of an example vertical orientation reactor.

FIG. 7 depicts example reactor 14-3, which may be used for reactor 14 in system 10 of FIG. 1. Reactor 14-3 may share elements that are the same or similar to those depicted in reactor 14-1 (FIG. 2) and/or reactor 14-2 (FIG. 6). Reactor 14-3 is constructed to be positioned with conduits 24 extending vertically. Conduits 24 may, for example comprise parallel conduits. Collector 28A is positioned at the top of reactor 14-3 and header 21C is positioned at the bottom. Reactor 14-3 receives molten medium 12 and input feed 11. Molten medium 12 is received at the top of reactor 14-3, into conduit 91, which transports molten medium 12 to header 21C located at the bottom of reactor 14-3. Distributor 22 mixes input feed 11 and molten medium 12.

The mixture of molten medium 12 and input feed 11 is carried through heated conduits 24 in reactor 14-3 to collector 28A. In this example embodiment, collector 28A is part of a multiphase separation unit 16, which separates received post-reaction mixture 41 into gaseous species 42 and liquid/solid species 43. In other embodiments, collector 28A and multiphase separation unit 16 are separate.

Molten medium 12 enters and leaves reactor 14-3 at approximately the same elevation. Advantageously, the U-shaped nature of reactor 14-3 allows molten medium 12 to be pumped through reactor 14-3 without having to overcome a hydrostatic pressure difference caused by an outlet of reactor 14-3 being higher in elevation than an inlet of reactor 14-3. In such embodiments, the principles of hydrostatics aid pump 13 in circulating molten medium 12 through reactor 14-3.

Figure 8:
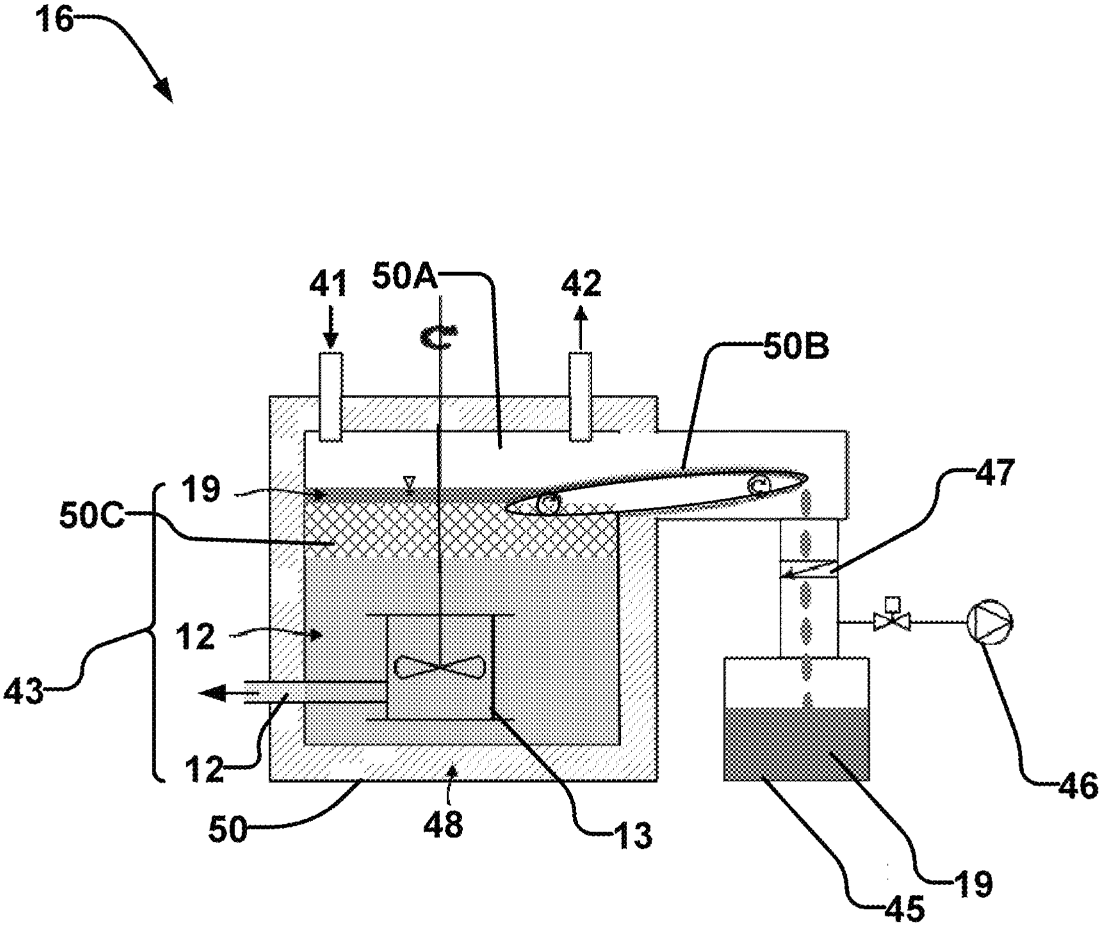
FIG. 8 is a schematic view of an example multi-phase separation unit.

Multiphase separation unit 16 receives post-reaction mixture 41 and separates post-reaction mixture 41 based on density into gaseous species 42 and liquid/solid species 43. Multiphase separation unit 16 may be a separate component or may be part of reactor 14. FIG. 8 schematically depicts an example multiphase separation unit 16. Multiphase separation unit 16 comprises a vessel 50 into which post-reaction mixture 41 is delivered. Gaseous species 42 rise into a headspace 50A of vessel 50 where they are collected. Gaseous species 42 may comprise produced hydrogen, remaining input feed 11, and any other gases present in post reaction mixture 41. Liquid/solid species 43 may comprise produced carbon 19 and molten medium 12.

Liquid/solid species 43 are further separated by density. The density of carbon 19 is less than the density of molten medium 12 allowing carbon 19 to float. A skimmer or other collection mechanism 50B (e.g., a chain/conveyor belt, decanter centrifuge, mesh filter, auger) may be provided to collect carbon 19 from the surface of molten medium 12. Carbon 19 may be removed from molten medium 12 continuously or periodically.

In some embodiments, molten medium 12 comprises a denser material (e.g., a liquid metal) and a less dense material (e.g., a molten salt). In such embodiments a layer 50C of the less dense material may form above the denser material. In such embodiments, carbon 19 may float to the top surface through layer 50C.

Carbon 19 may be stored in storage tank 45. Storage tank 45 may be separated from multiphase separation unit 16 by an air lock or one-way valve 47. Vacuum pump 46 may be connected to storage tank 45. Vacuum pump 46 may prevent excess air from entering multiphase separation unit 16.

Multiphase separation unit 16 may comprise insulator/heater 48. Insulator/heater 48 may maintain the temperature within multiphase separation unit 16. Insulator/heater 48 optionally heats multiphase separation unit 16. In some embodiments, pump 13 is integrated with multiphase separation unit 16.

Multiphase separation unit 16 outputs gaseous species 42. Gas purification unit 17 receives gaseous species 42 as input. Gaseous species 42 may contain some carbon 19. To remove residual carbon 19 present in gaseous species 42, gas purification unit 17 may comprise one or more of a cyclone, filter bags and a gas separation unit. Gaseous species 42 may be cooled prior to gas purification unit 17. Gaseous species 42 may, for example, be cooled by a heat exchanger. Gas purification unit 17 separates hydrogen gas 18A from other gaseous species 42.

Gas purification unit 17 may, for example, comprise a pressure swing adsorption gas separator or membrane gas separator. For example, hydrogen gas may diffuse through a hydrogen permeable membrane that blocks other gaseous species 42. In another example hydrogen may be separated from other gases using molecular sieve adsorbent particles that capture hydrogen but do not adsorb other gases that have molecules larger than hydrogen molecules. Molecular sieve adsorbent particles may, for example, be applied to separate hydrogen from other gases by pressure swing adsorption methods.

Separated hydrogen 18 may be compressed. Other remaining gaseous species 18B, may be recycled within system 10. For example, remaining gaseous species 18B may be purged to input feed 11, burned to heat reactor 14 or used for power generation.

Hydrogen 18A may be used in any applications where hydrogen is used including power generation systems such as fuel cells.

In some embodiments, gaseous species 42 is used directly for power generation, such as generating low-carbon intensity electricity or used in ammonia, steel, and cement industries to reduce the carbon intensity of their products.

System 10 optionally includes one or more compressor(s). For example, compressor(s) may be provided for one or more of:

- increasing the pressure of input feed 11;
- increasing the pressure of gaseous species 42; and/or
- increasing the pressure of collected hydrogen 18A.

System 10 may further comprise a pre-treatment unit that processes input feed 11 prior to reactor 14. The pre-treatment unit may remove one or more substances that are undesirable in the thermal cracking process. Examples of substances that are undesirable in the thermal cracking process include sand, water, oxygen and sulfur.

Figure 9:
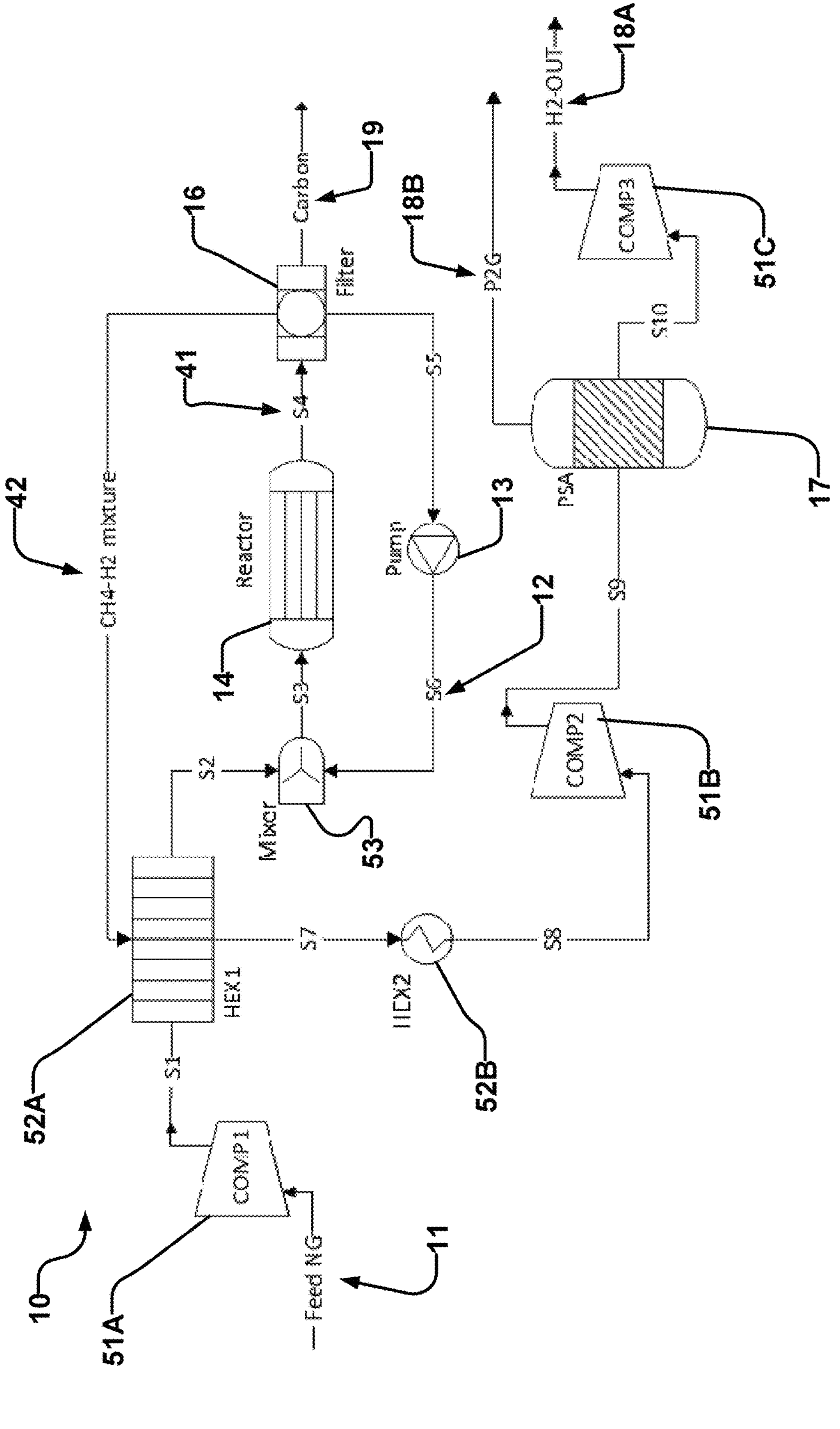
FIGS. 9-14 are schematic diagrams illustrating systems for hydrogen production according to example embodiments of the invention.

FIG. 9 is a more detailed schematic view of an example embodiment of system 10. Input feed 11 comprises natural gas. Input feed 11 is compressed by compressor 51A (COMP1). The compressed input feed 11 (S1) is preheated in heat exchanger 52A (HEX1) by gaseous species 42 ($CH_4$—$H_2$ mixture). The heated input feed 11 (S2) mixes with molten medium 12 (S6) in mixer 53. The mixture of input feed 11 and molten medium 12 (S3) passes into and through reactor 14.

Post-reaction mixture 41 (S4) passes through multiphase separation unit 16 (Filter). Multiphase separation unit 16 mechanically separates carbon 19 from molten medium 12. The separated molten medium 12 (S5) is recirculated by pump 13 through system 10.

Gaseous species 42 ($CH_4$—$H_2$ mixture) pass through heat exchanger 52A (HEX1) and the temperature of gaseous species 42 is further reduced by heat exchanger 52B (HEX2). The cooled gaseous species 42 (S8) is compressed by compressor 51B (COMP2). The compressed gaseous species 42 (S9) goes through gas purification unit 17. Gas purification unit 17 comprises a pressure swing adsorption (PSA) unit. The separated hydrogen (S10) is compressed by compressor 51C (COMP3) producing hydrogen 18A (H2-OUT) for delivery to end users. Remaining gaseous species 18B (P2G) is either reinjected to input feed 11, saved for use as a fuel, or burned for heat or power generation.

Figure 10:
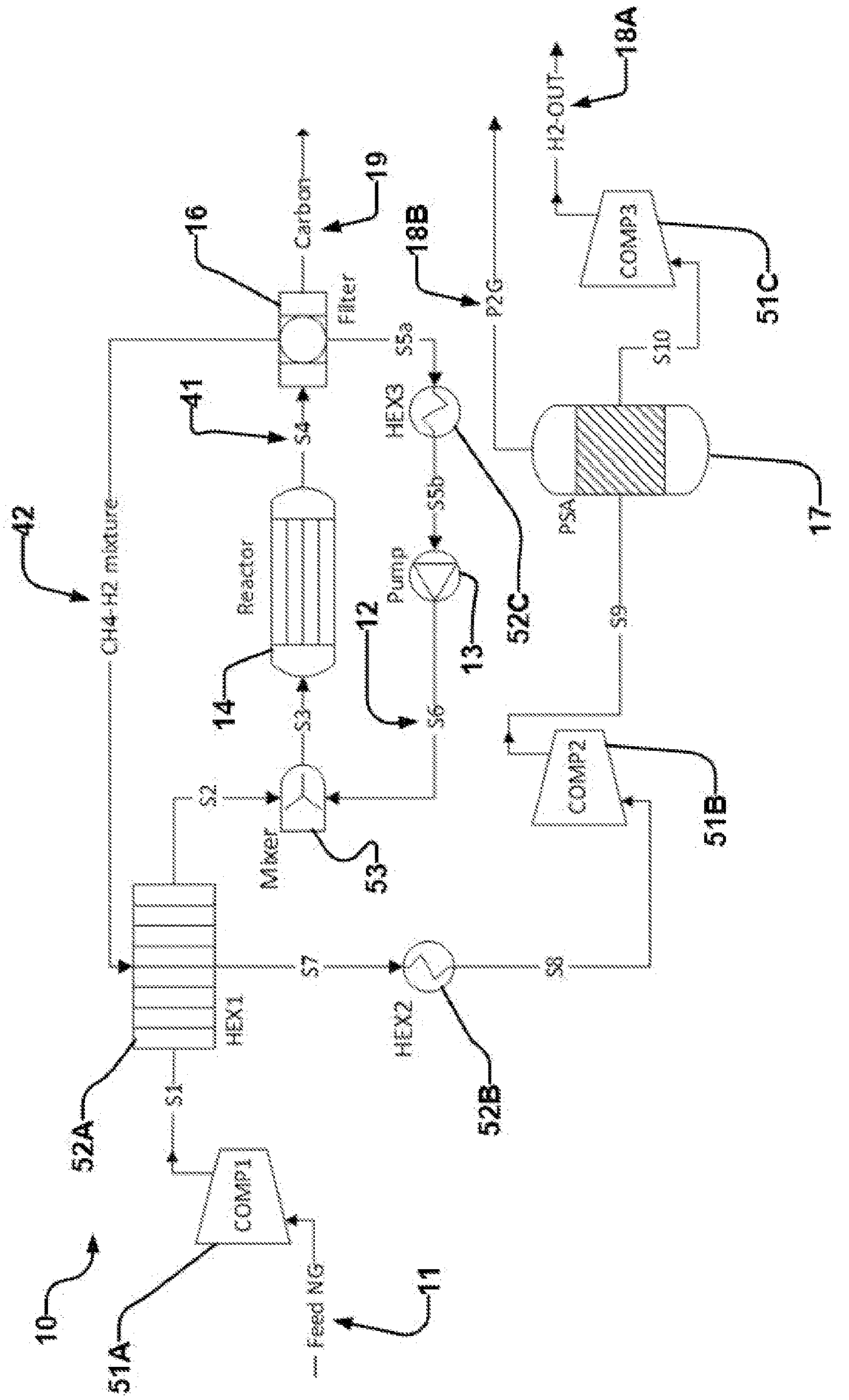

FIG. 10 depicts an example embodiment of system 10. This example embodiment is the same as that of FIG. 9 except for the addition of heat exchanger 52C (HEX3) positioned after multiphase separation unit 16. Heat exchanger 52C receives separated molten medium 12 (S5*a*) from multiphase separation unit 16 and cools it. Heat exchanger 52C outputs the cooled molten medium 12 (S5*b*) to pump 13. Providing somewhat cooler molten medium 12 to pump 13 may extend the life of pump 13. For example, heat exchanger 52C may cool molten medium 12 to a temperature that is within an operating temperature range of pump 13.

Figure 11:
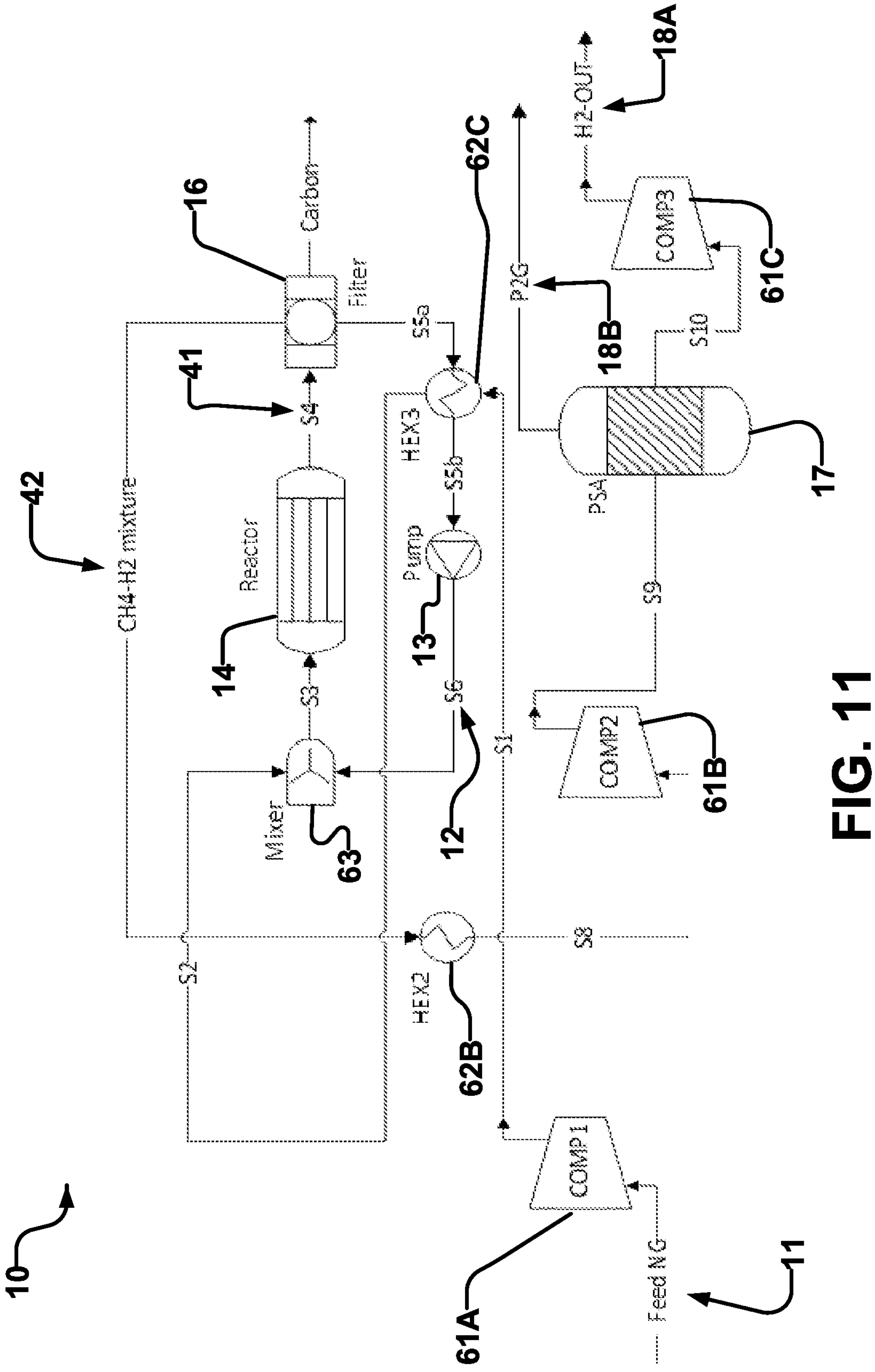

FIG. 11 depicts another example embodiment of system 10. Input feed 11 comprises natural gas. Input feed 11 is compressed by compressor 61A (COMP1). The compressed input feed 11 (S1) is preheated in heat exchanger 62C (HEX3) by separated molten medium 12 (S5*a*). The heated input feed 11 (S2) is mixed into molten medium 12 (S6) in mixer 63. The mixture of input feed 11 and molten medium 12 (S3) passes through reactor 14.

Post-reaction mixture 41 (S4) passes through multiphase separation unit 16 (Filter). The separated molten medium 12 (S5*a*) passes through heat exchanger 62C where it is cooled. The cooled molten medium 12 (S5*b*) is recirculated by pump 13 through system 10. Gaseous species 42 ($CH_4$—$H_2$ mixture) is cooled by heat exchanger 62B (HEX2). The cooled gaseous species 42 (S8) is compressed by compressor 61B (COMP2). The compressed gaseous species 42 (S9) is delivered to gas purification unit 17. Gas purification unit 17 comprises a pressure swing adsorption (PSA) unit. The separated hydrogen (S10) is compressed by compressor 61C (COMP3) producing hydrogen 18A (H2-OUT) for delivery to end users. Remaining gaseous species 18B (P2G) is either reinjected to input feed 11, stored for use as a fuel or burned for heat or power generation.

Figure 12:
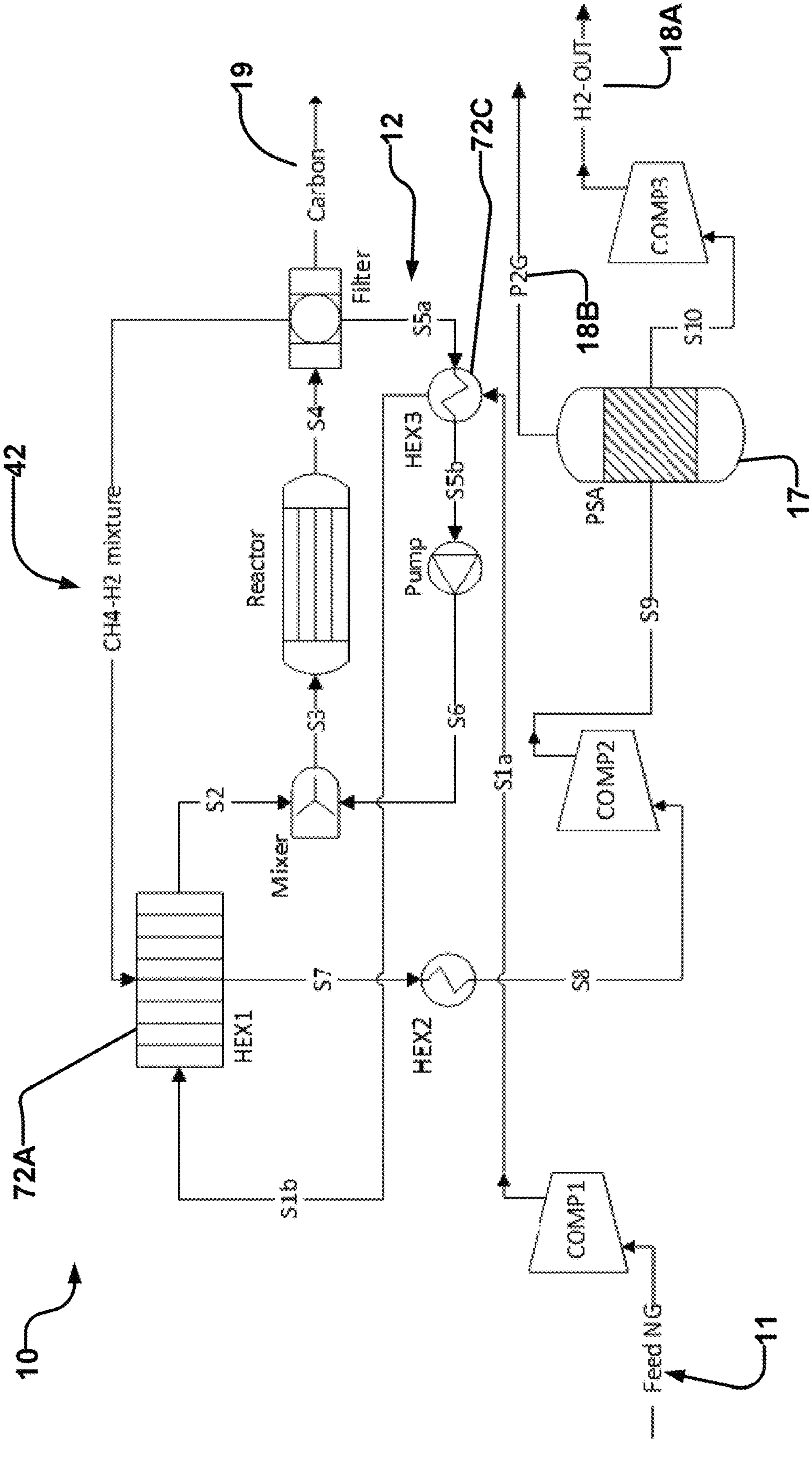

FIG. 12 depicts another example embodiment of system 10. This example embodiment combines features of the example embodiments depicted in FIGS. 9 and 11. In particular, input feed 11 is heated first in heat exchanger 72C (HEX3) by the separated molten medium 12 (S5*a*) (as in FIG. 11) and is then heated again in heat exchanger 72A (HEX1) by gaseous species 42 ($CH_4$—$H_2$ mixture) (as in FIG. 9). Other aspects of the FIG. 12 embodiment are the same as or similar to the embodiments depicted in FIGS. 9 and 11.

Figure 13:
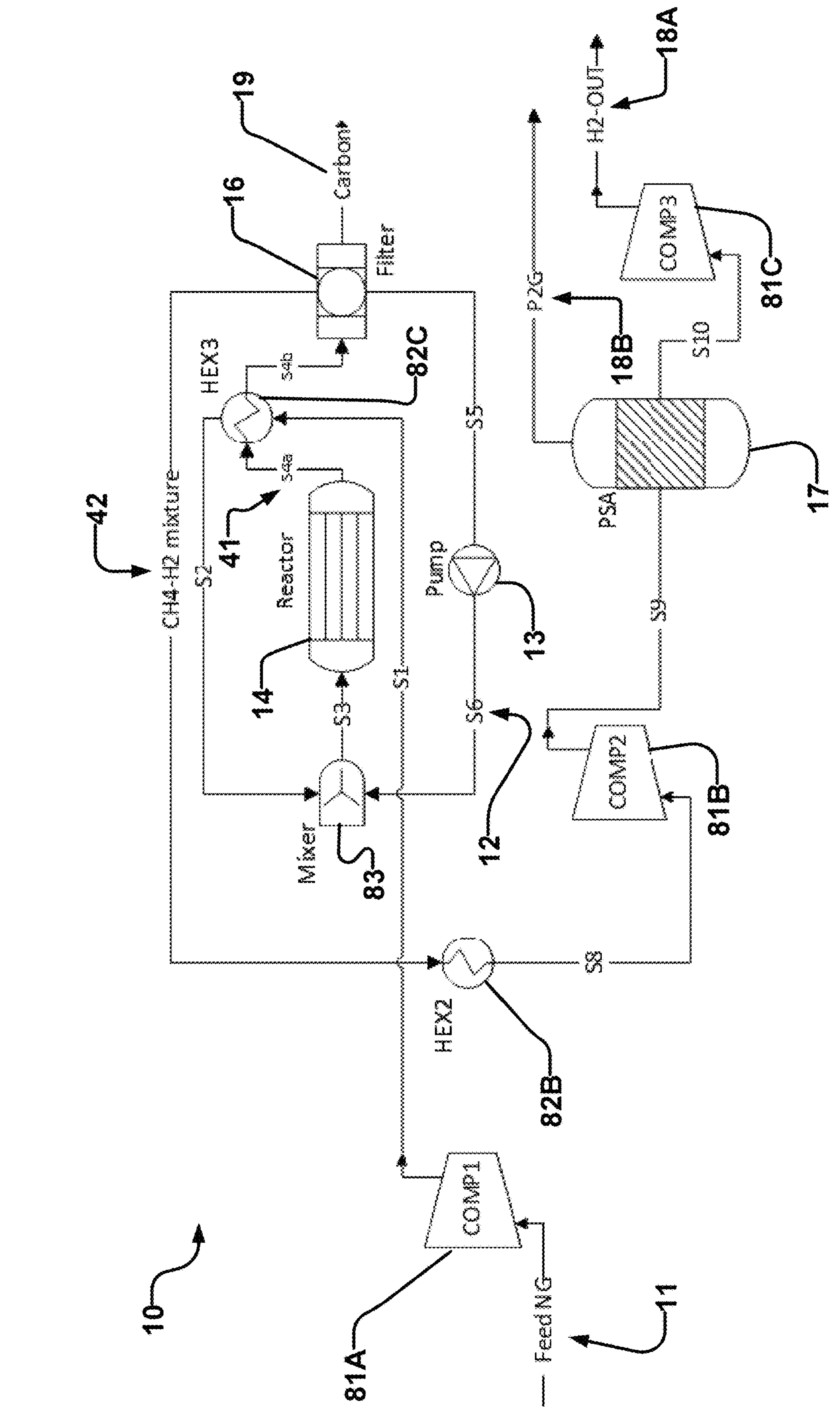

FIG. 13 depicts another example embodiment of system 10. Input feed 11 comprises natural gas. Input feed 11 is compressed by compressor 81A (COMP1). The compressed input feed 11 (S1) is preheated in heat exchanger 82C (HEX3) by post-reaction mixture 41 (S4*a*). The heated input feed 11 (S2) mixes with molten medium 12 (S6) in mixer 83. The mixture of input feed 11 and molten medium 12 (S3) passes through reactor 14. Post-reaction mixture 41 (S4*a*) passes through heat exchanger 82C (HEX3), where it is cooled. The cooled post-reaction mixture 41 (S4*b*) passes through multiphase separation unit 16. The separated molten medium 12 (S5) is recirculated by pump 13 through system 10.

Gaseous species 42 ($CH_4$—$H_2$ mixture) is cooled by heat exchanger 82B (HEX2). The cooled gaseous species 42 (S8) is compressed by compressor 81B (COMP2). The compressed gaseous species 42 (S9) goes through gas purification unit 16. Gas purification unit 16 comprises a pressure swing adsorption (PSA) unit. The separated hydrogen (S10) is compressed by compressor 81C (COMP3) producing hydrogen 18A (H2-OUT) for delivery to end users. Remaining gaseous species 18B (P2G) is either reinjected to input feed 11, stored for use as a fuel or burned for heat or power generation. Such embodiments allow the separation of carbon 19 from post-reaction mixture 41 at a lower temperature. Such embodiments may also advantageously cool molten medium 12 that is flowing into pump 13 to a temperature that is equal to or below the operating temperature of pump 13.

Figure 14:
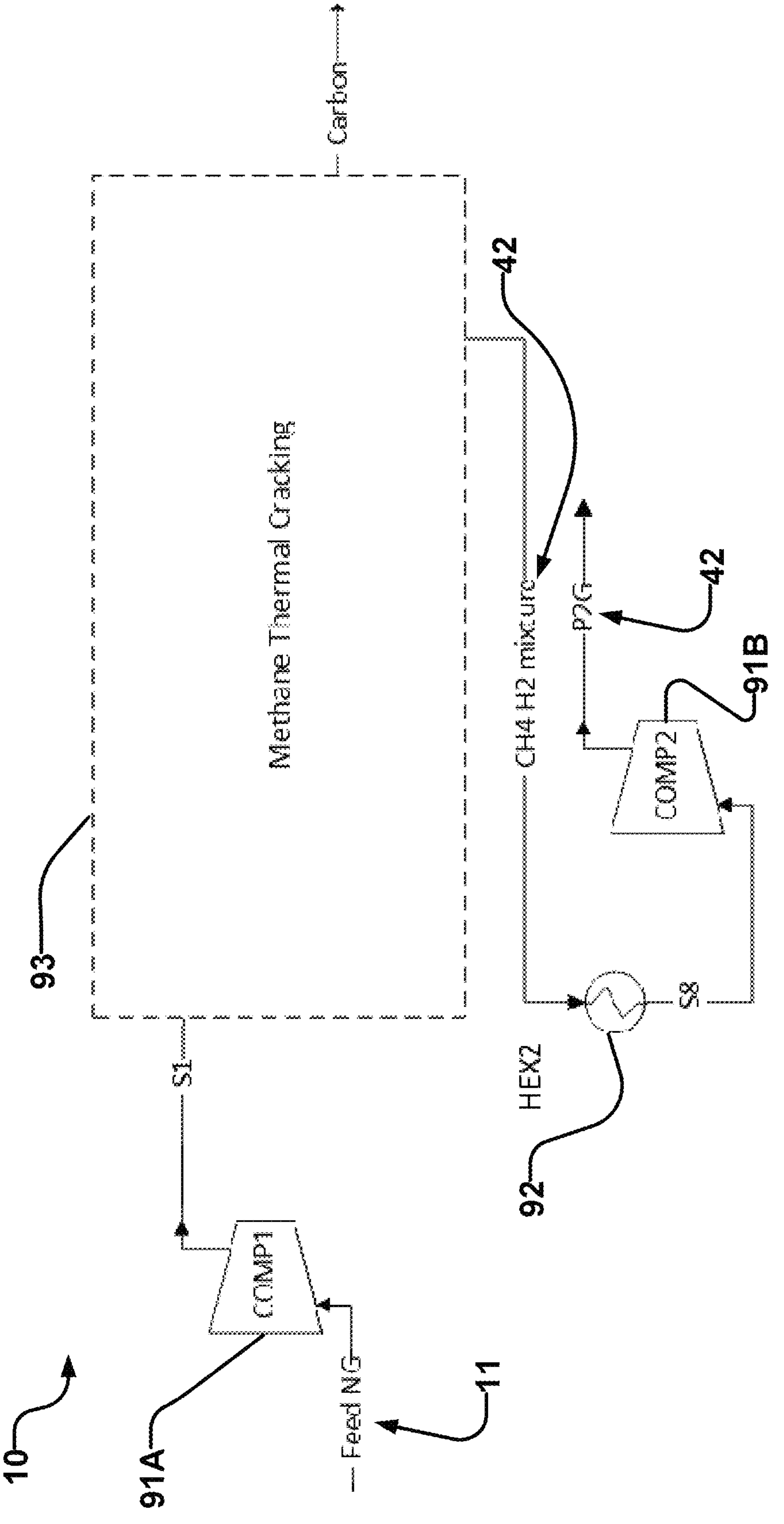

FIG. 14 depicts another example embodiment of system 10. Input feed 11 comprises natural gas. Input feed 11 is compressed by compressor 91A (COMP1) prior to methane thermal cracking block 93. Methane thermal cracking block 93 may comprise any embodiment, partial embodiment or combination of embodiments discussed herein. Gaseous species 42 ($CH_4$—$H_2$ mixture) is cooled by heat exchanger 92 (HEX2). The cooled gaseous species 42 (S8) is compressed by compressor 91B (COMP2). Compressed gaseous species 42 (P2G) is delivered to end users without further hydrogen purification.

Those of skill in the art will appreciate that the technology described herein can be applied to produce hydrogen gas at a low cost.

The design and operating parameters of system 10 as described herein may be selected to achieve a desirable recovery of hydrogen. In some embodiments, converting 60% of input feed 11 to hydrogen is optimal when considering the priority of cost. Cost is defined as the inverse of efficiency. Efficiency is defined as:

$$\text{Efficiency} = \text{Heating value of hydrogen produced [J/s]/power input [J/s].} \quad (3)$$

Conversion rates of hydrogen in molecules of input feed 11 to hydrogen gas approaching 100% are possible at the cost of:

- increased capital cost of system 10 (e.g., to provide larger equipment, such as larger reactors, multiphase separation units and pumps);
- increased production of byproduct species such as ethylene or acetylene; and/or
- reduced overall hydrogen production.

Factors that may increase efficiency of a system as described herein include:

(i) Flow rate (see Table 2). An optimal flow rate of input feed 11 and molten medium 12 provides enough dwell time for input feed 11 to be thermally cracked to hydrogen and carbon black. An optimal flow rate of input feed 11 will depend on the design and operating parameters of a system as described herein.

TABLE 2

Effects of feed natural gas flow rates

| | Feed NG mass flow rate (kg/h) | | | | |
|---|---|---|---|---|---|
| | 0.1 | 0.2 | 0.3 | 0.4 | 0.5 |
| Methane conversion in Reactor | 89% | 72% | 59% | 50% | 44% |
| Hydrogen yield in Reactor | 89% | 72% | 59% | 50% | 44% |
| Hydrogen Production (H2-OUT) ($kg_{H2\text{-}OUT}$/kg $CH_4$) | 0.18 | 0.144 | 0.12 | 0.10 | 0.09 |
| Hydrogen Production (P2G) (kg $H_{2\text{-}P2G}$/kg $CH_4$) | 0.04 | 0.036 | 0.03 | 0.03 | 0.02 |
| $CH_4$ return (P2G) (kg $CH_{4\text{-}P2G}$/kg $CH_4$) | 0.11 | 0.28 | 0.41 | 0.50 | 0.56 |
| Hydrogen Production (H2-OUT + P2G) (kg $H_2$/kg $CH_4$) | 0.22 | 0.18 | 0.15 | 0.13 | 0.11 |
| Carbon production (SOLIDS) (kg C/kg $CH_4$) | 0.67 | 0.54 | 0.44 | 0.38 | 0.33 |
| $W_{comp}$ per kg $H_2$ (at 20 bar) (kWh/kg $H_2$) | 2.05 | 2.29 | 2.53 | 2.78 | 3.02 |
| Heat reactor per kg $H_2$ (kWh/kg $H_2$) | 7.31 | 7.45 | 7.60 | 7.75 | 7.90 |
| $W_{pump}$ per kg $H_2$ (for pumping molten metal) (kWh/kg $H_2$) | 0.47 | 0.59 | 0.71 | 0.83 | 0.95 |

TABLE 2-continued

| Effects of feed natural gas flow rates | | | | | |
|---|---|---|---|---|---|
| $CO_2$ emission per kg $H_2$ (at 20 bar) (kg $CO_2$/kg $H_2$) | 1.75 | 1.84 | 1.93 | 2.03 | 2.12 |
| Process efficiency ($H_2$ Out at 20 bar) | 50.2% | 41% | 34% | 30% | 26% |
| $H_2$ price (at 20 bar w/o P2G and carbon sales) (\$/kg $H_{2\text{-}OUT}$) | 1.412 | 1.729 | 2.061 | 2.393 | 2.723 |
| $H_2$ price (at 20 bar with P2G w/o carbon sales) (\$/kg $H_2$) | 1.025 | 1.032 | 1.040 | 1.047 | 1.054 |
| $H_2$ price (at 20 bar with carbon sales w/o P2G) (\$/kg $H_{2\text{-}OUT}$) | 1.039 | 1.356 | 1.689 | 2.021 | 2.350 |
| $H_2$ price (at 20 bar with P2G and carbon sales) (\$/kg $H_2$) | 0.727 | 0.734 | 0.742 | 0.749 | 0.756 |
| $H_2$ price (at 20 bar w/o P2G and carbon sales + CO2 tax) (\$/kg $H_{2\text{-}OUT}$) | 1.521 | 1.844 | 2.182 | 2.520 | 2.855 |
| $H_2$ price (at 20 bar with P2G and carbon sales + CO2 tax) (\$/kg $H_2$) | 0.815 | 0.826 | 0.838 | 0.850 | 0.862 |
| Daily hydrogen production (H2-OUT) (kg/day) | 0.431 | 0.691 | 0.857 | 0.974 | 1.062 |
| Daily hydrogen production (P2G) (kg/day) | 0.108 | 0.173 | 0.214 | 0.243 | 0.265 |
| Total daily hydrogen production (kg/day) | 0.539 | 0.863 | 1.071 | 1.217 | 1.327 |
| Reactor modules for 100 t $H_{2\text{-}OUT}$/day | | | | | |
| Total number of tube reactors | 231750 | 144785 | 116746 | 102694 | 94179 |
| Footprint of reactor tubes ($m^2$) | 123.1 | 76.9 | 62.0 | 54.6 | 50.0 |
| Total number of reactor modules to fit inside a container | 36 | 23 | 18 | 16 | 15 |
| Daily hydrogen production (H2-OUT) per module (t/day/module) | 2.78 | 4.35 | 5.56 | 6.25 | 6.67 |
| Daily hydrogen production (P2G) per module (t/day/module) | 0.69 | 1.09 | 1.39 | 1.56 | 1.67 |
| Total daily hydrogen production per module (t/day/module) | 3.47 | 5.43 | 6.94 | 7.81 | 8.33 |
| Total daily hydrogen production per module ($Nm^3$/h/module) | 1609.7 | 2519.5 | 3219.3 | 3621.7 | 3863.2 |

| | Feed NG mass flow rate (kg/h) | | |
|---|---|---|---|
| | 0.6 | 0.7 | 0.8 |
| Methane conversion in Reactor | 39% | 35% | 32% |

TABLE 2-continued

| Effects of feed natural gas flow rates | | | |
|---|---|---|---|
| Hydrogen yield in Reactor | 39% | 35% | 32% |
| Hydrogen Production (H2-OUT) ($kg_{H2-OUT}$/kg $CH_4$) | 0.08 | 0.07 | 0.06 |
| Hydrogen Production (P2G) (kg $H_{2-P2G}$/kg $CH_4$) | 0.02 | 0.02 | 0.02 |
| $CH_4$ return (P2G) (kg $CH_{4-P2G}$/kg $CH_4$) | 0.61 | 0.65 | 0.68 |
| Hydrogen Production (H2-OUT + P2G) (kg $H_2$/kg $CH_4$) | 0.10 | 0.09 | 0.08 |
| Carbon production (SOLIDS) (kg C/kg $CH_4$) | 0.29 | 0.26 | 0.24 |
| $W_{comp}$ per kg $H_2$ (at 20 bar) (kWh/kg $H_2$) | 3.26 | 3.50 | 3.74 |
| Heat reactor per kg $H_2$ (kWh/kg $H_2$) | 8.05 | 8.20 | 8.35 |
| $W_{pump}$ per kg $H_2$ (for pumping molten metal) (kWh/kg $H_2$) | 1.07 | 1.19 | 1.31 |
| CO2 emission per kg $H_2$ (at 20 bar) (kg $CO_2$/kg $H_2$) | 2.21 | 2.30 | 2.39 |
| Process efficiency ($H_2$ Out at 20 bar) | 23% | 21% | 19% |
| $H_2$ price (at 20 bar w/o P2G and carbon sales) (\$/kg $H_{2-OUT}$) | 3.050 | 3.376 | 3.700 |
| $H_2$ price (at 20 bar with P2G w/o carbon sales) (\$/kg $H_2$) | 1.062 | 1.069 | 1.076 |
| $H_2$ price (at 20 bar with carbon sales w/o P2G) (\$/kg $H_{2-OUT}$) | 2.678 | 3.003 | 3.327 |
| $H_2$ price (at 20 bar with P2G and carbon sales) (\$/kg $H_2$) | 0.764 | 0.771 | 0.778 |
| $H_2$ price (at 20 bar w/o P2G and carbon sales + CO2 tax) (\$/kg H2-OUT) | 3.188 | 3.519 | 3.849 |
| $H_2$ price (at 20 bar with P2G and carbon sales + CO2 tax) (\$/kg $H_2$) | 0.874 | 0.886 | 0.898 |
| Daily hydrogen production (H2-OUT) (kg/day) | 1.131 | 1.186 | 1.233 |
| Daily hydrogen production (P2G) (kg/day) | 0.283 | 0.297 | 0.308 |
| Total daily hydrogen production (kg/day) | 1.413 | 1.483 | 1.541 |
| | Reactor modules for 100 t $H_{2-OUT}$/day | | |
| Total number of tube reactors | 88433 | 84283 | 81136 |
| Footprint of reactor tubes ($m^2$) | 47.0 | 44.8 | 43.1 |

TABLE 2-continued

| Effects of feed natural gas flow rates | | | |
|---|---|---|---|
| Total number of reactor modules to fit inside a container | 14 | 13 | 13 |
| Daily hydrogen production (H2-OUT) per module (t/day/module) | 7.14 | 7.69 | 7.69 |
| Daily hydrogen production (P2G) per module (t/day/module) | 1.79 | 1.92 | 1.92 |
| Total daily hydrogen production per module (t/day/module) | 8.93 | 9.62 | 9.62 |
| Total daily hydrogen production per module ($Nm^3$/h/module) | 4139.1 | 4457.5 | 4457.5 |

(ii) Temperature of molten medium 12. A high temperature (e.g., 900° C.-1200° C.) increases the reaction rate and conversion rate of input feed 11 (see Table 3). In some cases the efficiency gained from an increase in temperature is counter balanced by increased capital cost for equipment that can withstand operation at higher temperatures and reduced durability of the equipment, the power input to system 10 and the maintenance cost, all of which can be increased significantly when operating temperatures are increased to more than 1100° C.

TABLE 3

Effect of Reactor Operating Temperature

| | Reactor temperature (° C.) | | | | | | |
|---|---|---|---|---|---|---|---|
| | 800 | 850 | 900 | 950 | 1000 | 1050 | 1100 |
| Methane conversion in Reactor | 0% | 1% | 4% | 20% | 47% | 89% | 100% |
| Hydrogen yield in Reactor | 0% | 1% | 4% | 20% | 47% | 89% | 100% |
| Hydrogen Production (H2-OUT) (kg $H_{2\text{-}OUT}$/kg $CH_4$) | 0.000 | 0.001 | 0.01 | 0.04 | 0.09 | 0.18 | 0.20 |
| Hydrogen Production (P2G) (kg $H_{2\text{-}P2G}$/kg $CH_4$) | 0.000 | 0.000 | 0.00 | 0.01 | 0.02 | 0.04 | 0.05 |
| CH4 return (P2G) (kg $CH_{4\text{-}P2G}$/kg $CH_4$) | 1.00 | 0.99 | 0.96 | 0.80 | 0.53 | 0.11 | 0.00 |
| Hydrogen Production (H2-OUT + P2G) (kg $H_2$/kg $CH_4$) | 0.00 | 0.00 | 0.01 | 0.05 | 0.12 | 0.22 | 0.25 |
| Carbon production (SOLIDS) (kg C/kg $CH_4$) | 0.00 | 0.00 | 0.03 | 0.15 | 0.35 | 0.67 | 0.75 |
| $W_{comp}$ per kg $H_2$ (at 20 bar) (kWh/kg $H_2$) | 1075.28 | 133.98 | 21.36 | 5.24 | 2.89 | 2.05 | 1.96 |
| $Heat_{reactor}$ per kg $H_2$ (kWh/kg $H_2$) | 139.33 | 23.32 | 9.16 | 7.14 | 7.14 | 7.31 | 7.45 |
| $W_{pump}$ per kg $H_2$ (for pumping molten metal) (kWh/kg $H_2$) | 458.47 | 59.40 | 9.46 | 2.01 | 0.89 | 0.47 | 0.43 |
| $CO_2$ emission per kg $H_2$ (at 20 bar) (kg $CO_2$/kg $H_2$) | 298.44 | 38.65 | 7.13 | 2.57 | 1.95 | 1.75 | 1.75 |
| Process efficiency (H2-OUT at 20 bar) | 0.0% | 0.4% | 2.6% | 12.5% | 27.9% | 50.2% | 55.3% |
| $H_2$ price (at 20 bar w/o P2G and carbon sales) (\$/kg $H_{2\text{-}OUT}$) | 1443.057 | 178.666 | 27.345 | 5.688 | 2.539 | 1.412 | 1.282 |

TABLE 3-continued

| Effect of Reactor Operating Temperature | | | | | | | |
|---|---|---|---|---|---|---|---|
| | Reactor temperature (° C.) | | | | | | |
| | 800 | 850 | 900 | 950 | 1000 | 1050 | 1100 |
| $H_2$ price (at 20 bar with P2G w/o carbon sales) (\$/kg $H_2$) | 24.976 | 4.004 | 1.459 | 1.091 | 1.041 | 1.025 | 1.025 |
| $H_2$ price (at 20 bar with carbon sales w/o P2G) (\$/kg $H_{2\text{-}OUT}$) | 1442.684 | 178.294 | 26.973 | 5.315 | 2.167 | 1.039 | 0.909 |
| $H_2$ price (at 20 bar with P2G and carbon sales) (\$/kg $H_2$) | 24.678 | 3.706 | 1.161 | 0.793 | 0.743 | 0.727 | 0.727 |
| $H_2$ price (at 20 bar w/o P2G and carbon sales + CO2 tax) (\$/kg $H_{2\text{-}OUT}$) | 1461.709 | 181.082 | 27.791 | 5.848 | 2.661 | 1.521 | 1.391 |
| $H_2$ price (at 20 bar with P2G and carbon sales + CO2 tax) (\$/kg $H_2$) | 39.600 | 5.639 | 1.518 | 0.921 | 0.840 | 0.815 | 0.815 |

(iii) Dwell time of input feed 11 in reactor 14. An optimal dwell time of input feed 11 in reactor 14 increases the conversion rate of input feed 11 and the overall hydrogen production, reduces the cost of hydrogen production and prevents the deposition of carbon black in reactor 14. The optimal dwell time is design specific. The optimal dwell time of input feed 11 in reactor 14 may be affected by one or more of:
- the flow rate of input feed 11;
- the flow rate of molten medium 12;
- the length and diameter of conduits 24;
- the total number of conduits 24 in conduit bundles 25;
- the temperature of input feed 11;
- the temperature of molten medium 12;
- the temperature of heated fluid 32;
- the size of nozzles in distributor 22; and
- the size of gas bubbles generated by bubble generator 23.

(iv) Composition of molten medium 12. The composition of molten medium 12 may have one or more of catalytic effects, a higher thermal conductivity than the materials of conduits 24 and a higher thermal mass than input feed 12 which may increase efficiency.

(v) Recycling of molten medium 12 within system 10.

(vi) Turbulence of molten medium 12.

(vii) Bubbling input feed 11 using a porous ceramic or sparger with a pore size of 50 microns or less.

(viii) Bubble size of input feed 11. The smaller the bubble size the more surface area is in contact between bubble of input feed 11 and molten medium 12, which may increase efficiency.

Factors that may decrease efficiency include:

(i) Flow rate. A flow rate that is higher or lower than the optimum flow rate decreases efficiency.

(ii) Composition of molten medium 12. As the solubility of hydrogen in molten medium 12 and instability of molten medium 12 within system 10 increase, the efficiency may decrease.

(iii) Pressure within reactor 14. Increasing the pressure in reactor 14 decreases the efficiency. It is preferred to operate reactor 14 at approximately atmospheric pressure.

(iv) Pressure changes within reactor 14. Hydrostatic pressure within reactor 14 decreases efficiency.

It is possible to scale up the production of hydrogen by one or more of:

(i) Using plural reactors 14;

(ii) Providing reactor(s) 14 with more conduits 24;

(iii) Making reactor(s) 14 with longer conduits 24;

(iv) Increasing the rate of injection of input feed 11;

(v) Increasing the temperature of molten medium 12; and (vi) Increasing the temperature of heated fluid 32.

In order to increase production, it is preferable to use multiple reactors or use more conduits. Increasing the hydrocarbon injection rate may increase the hydrogen production rate, but may also decrease the conversion rate of input feed 11 to hydrogen, thereby reducing the overall efficiency of system 10.

The technology described herein may, for example, be implemented at or near natural gas facilities (e.g., pipelines, liquefied natural gas facilities) or at or near the point of use of produced hydrogen. Such flexibility allows the present technology to be installed in any geographic location with access to natural gas or other suitable hydrocarbons as a feedstock.

The present disclosure explains various methods according to the invention. Such methods may be applied using systems and apparatus that differ from the example systems and apparatus in the context of the systems depicted in the drawings. Many variations are possible.

In some embodiments, methods according to the present invention may control the flow of a molten medium through a reactor to match a demand for production of hydrogen and/or to match an available supply of a hydrocarbon to be thermally cracked. For example when demand for hydrogen is low and/or where the supply of hydrocarbon available for cracking is low, a system of the general type described herein may be placed in a standby mode in which the molten medium is kept molten but is flowed around a process loop at a reduced flow rate or intermittently. In the standby mode a temperature of the molten medium may be allowed to drop to a temperature lower than a regular operating temperature.

During production of hydrogen, operating parameters such as an amount of heat supplied to a reactor and/or a flow rate of a molten medium and/or an amount of preheating provided to input feed may be adjusted to maintain optimum performance while the amount of input feed is varied.

REFERENCES

The entire disclosures of all applications, patents, and publications, cited above and below, are hereby incorporated by reference. However, it will be apparent to persons skilled in the art that a number of variations and modifications can be made without departing from the scope of the invention as defined in the claims. The reference to any prior art in this specification is not, and should not be taken as, an acknowledgement or any form of suggestion that that prior art forms part of the common general knowledge in Canada or any other country.

Körner, C. Tam, S. Bennett, J. F. Gagné, Technology roadmap—Hydrogen and fuel cells, International Energy Agency (IEA), 2015.

D. J. Lampert, H. Cai, A. Elgowainy, Wells to wheels: water consumption for transportation fuels in the United States, Energy Environ. Sci. 9 (2016) 787-802. doi:10.1039/C5EE03254G.

Parkinson, J. W. Matthews, T. B. McConnaughy, D. C. Upham, E. W. McFarland, Techno-Economic Analysis of Methane Pyrolysis in Molten Metals: Decarbonizing Natural Gas, Chem. Eng. Technol. 40, no. 6 (2017) 1022-1030. doi:10.1002/ceat.201600414.

G. Collodi, G. Azzaro, N. Ferrari, S. Santos, Techno-economic Evaluation of Deploying CCS in SMR Based Merchant H2 Production with NG as Feedstock and Fuel, Energy Procedia. 114 (2017) 2690-2712. doi:10.1016/j.egypro.2017.03.1533.

R. Dagle, V. Dagle, M. Bearden, J. Holladay, T. Krause, S. Ahmed, R&D Opportunities for Development of Natural Gas Conversion Technologies for Co-Production of Hydrogen and Value-Added Solid Carbon Products, Argonne National Laboratory, U.S., 2017.

Paxman, Experimental and Theoretical Investigation of Solar Molten Media Methane Cracking for Hydrogen Production, University of Alberta, 2014. doi:10.1016/j.egypro.2014.03.215.

U. P. M. Ashik, W. M. A. Wan Daud, H. F. Abbas, Production of greenhouse gas free hydrogen by thermocatalytic decomposition of methane—A review, Renew. Sustain. Energy Rev. 44 (2015) 221-256. doi:10.1016/j.rser.2014.12.025.

B. Parkinson, P. Balcombe, J. F. Speirs, A. D. Hawkes, K. Hellgardt, Levelized cost of $CO_2$ mitigation from hydrogen production routes, Energy Environ. Sci. 12 (2019) 19-40. doi:10.1039/c8ee02079e.

B. B. Alchagirov, A. M. Chochaeva, Temperature dependence of the density of liquid tin, High Temp. 38 (2000) 44-48. doi:10.1007/BF02755565.

M. Serban, M. A. Lewis, C. L. Marshall, R. D. Doctor, Hydrogen production by direct contact pyrolysis of natural gas, Energy and Fuels. 17, no. 3 (2003) 705-713. doi:10.1021/ef020271q.

D. C. Upham, V. Agarwal, A. Khechfe, Z. R. Snodgrass, M. J. Gordon, H. Metiu, E. W. McFarland, Catalytic molten metals for the direct conversion of methane to hydrogen and separable carbon, Science 358 (2017) 917-921. doi:10.1126/science.aao5023.

Cornejo, The Thermo-Catalytic Decomposition of Methane for Economical and Emission-Free Hydrogen Production, University of Western Australia, 2013.

Paxman, S. Trottier, M. R. Flynn, L. Kostiuk, M. Secanell, Experimental and numerical analysis of a methane thermal decomposition reactor, Int. J. Hydrogen Energy. 42 (2017) 25166-25184. doi:10.1016/j.ijhydene.2017.08.134.

M. Plevan, T. Geißler, A. Abánades, K. Mehravaran, R. K. Rathnam, C. Rubbia, D. Salmieri, L. Stoppel, S. Stückrad, T. Wetzel, Thermal cracking of methane in a liquid metal bubble column reactor: Experiments and kinetic analysis, Int. J. Hydrogen Energy. 40 (2015) 8020-8033. doi:10.1016/j.ijhydene.2015.04.062.

T. Geißler, M. Plevan, A. Abánades, A. Heinzel, K. Mehravaran, R. K. K. Rathnam, C. Rubbia, D. Salmieri, L. Stoppel, S. Stückrad, A. Weisenburger, H. Wenninger, T. Wetzel, A. Heinzel, A. Abánades, A. Weisenburger, M. Plevan, K. Mehravaran, R. K. K. Rathnam, T. Wetzel, L. Stoppel, T. Geißler, C. Rubbia, Experimental investigation and thermo-chemical modeling of methane pyrolysis in a liquid metal bubble column reactor with a packed bed, Int. J. Hydrogen Energy. 40 (2015) 14134-14146. doi:10.1016/j.ijhydene.2015.08.102.

T. Geißler, A. Abánades, A. Heinzel, K. Mehravaran, G. Müller, R. K. K. Rathnam, C. Rubbia, D. Salmieri, L. Stoppel, S. Stückrad, A. Weisenburger, H. Wenninger, T. Wetzel, D. Salmieri, C. Rubbia, L. Stoppel, K. Mehravaran, A. Heinzel, G. Müller, T. Geißler, A. Weisenburger, R. K. K. Rathnam, A. Abánades, H. Wenninger, Hydrogen production via methane pyrolysis in a liquid metal bubble column reactor with a packed bed, Chem. Eng. J. 299 (2016) 192-200. doi:10.1016/j.cej.2016.04.066.

A. A. Munera Parra, D. W. Agar, Molten metal capillary reactor for the high-temperature pyrolysis of methane, Int. J. Hydrogen Energy. 42 (2017) 13641-13648. doi:10.1016/j.ijhydene.2016.12.044.

E. W. Mcfarland, C. Upham, M, J. Zeng, C. Palmer, S. Su, D. Mannini, D. Kang, N. Rahimi, H. Metiu, M. Gordon, Simultaneous reaction and separation of chemicals (WO2019099795A1), 2019.

Kang, N. Rahimi, M. J. Gordon, H. Metiu, E. W. McFarland, Catalytic methane pyrolysis in molten MnCl2-KCl, Appl. Catal. B Environ. 254 (2019) 659-666. doi:10.1016/j.apcatb.2019.05.026.

N. Rahimi, D. Kang, J. Gelinas, A. Menon, M. J. Gordon, H. Metiu, E. W. McFarland, Solid carbon production and recovery from high temperature methane pyrolysis in bubble columns containing molten metals and molten salts, Carbon N.Y. 151 (2019) 181e191 Contents. doi:10/1016/j.carbon.2019.05.041.

A. H. Stiller, Method for production of carbon and hydrogen from natural gas and other hydrocarbons, US2019/0241433 A1, 2019.

Interpretation of Terms

Unless the context clearly requires otherwise, throughout the description and the claims:

"about" when applied to a numerical value means ±10%;

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g., a pump, reactor, assembly, device, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. All possible combinations of such features are contemplated by this disclosure even where such features are shown in different drawings and/or described in different sections or paragraphs. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A method for thermal cracking of a hydrocarbon to produce hydrogen gas, the method comprising:

pumping a molten medium to flow through a reactor;

mixing the hydrocarbon into the molten medium at or upstream from the reactor such that the mixed hydrocarbon and molten medium is carried through the reactor;

maintaining a turbulent flow of the mixed molten medium and hydrocarbon in the reactor;

at least while the mixed hydrocarbon and molten medium is being carried through the reactor, maintaining a temperature of the molten medium within at least a portion of the reactor at an operating temperature sufficient to thermally crack the hydrocarbon such that the hydrocarbon in the mixed molten medium and hydrocarbon is thermally cracked to yield carbon and the hydrogen gas; and separating the carbon and the hydrogen gas from the molten medium that has passed through the reactor, wherein the reactor comprises a plurality of conduits and pumping the mixed molten medium and the hydrocarbon through the reactor comprises flowing portions of the mixed molten medium and the hydrocarbon through each of the plurality of conduits.

2. The method according to claim 1 wherein a flow rate of the molten medium in the reactor is such that the flow of the molten medium is characterized by a Reynolds number of at least 3000.

3. The method according to claim 1 wherein a flow rate of the molten medium is sufficient to maintain the turbulent flow in the reactor in the absence of the hydrocarbon.

4. The method according to claim 1 comprising, in the reactor generating the hydrogen gas and the carbon by thermal cracking of the hydrocarbon wherein the thermal cracking of the hydrocarbon occurs primarily in the bulk of the molten medium.

5. The method according to claim 1 wherein mixing the hydrocarbon into the molten medium comprises introducing bubbles of the hydrocarbon into the molten medium.

6. The method according to claim 5 wherein a bubble generator for introducing the bubbles comprises a porous metal or ceramic.

7. The method according to claim 6 wherein the porous metal or ceramic of the bubble generator has pore sizes in the range of about 2 microns to about 50 microns.

8. The method according to claim 1 wherein the plurality of conduits define passages of sufficiently large dimensions to allow a 0.7 inch diameter sphere to be passed along the plurality of conduits without contacting a wall of the plurality of conduits.

9. The method according to claim 1 comprising preheating the hydrocarbon prior to mixing the hydrocarbon into the molten medium.

10. The method according to claim 1 wherein the reactor comprises a plurality of conduits and the method comprises dividing circulating molten medium so that a portion of the circulating molten medium flows through each of the plurality of conduits.

11. The method according to claim 10 wherein the plurality of conduits comprise parallel conduits and a ratio of width to height of the parallel conduits is at least 20:1.

12. The method according to claim 10 wherein a dwell time of the mixed molten medium and the hydrocarbon in each of the plurality of conduits is in the range of 0.1 s to 100 s.

* * * * *